United States Patent
Oh et al.

[11] Patent Number: 5,937,103
[45] Date of Patent: Aug. 10, 1999

[54] METHOD AND APPARATUS FOR ALIAS FREE MEASUREMENT OF OPTICAL TRANSFER FUNCTION

[75] Inventors: Seho Oh, Mukilteo; Keith L. Frost, Seattle; Michael J. Seo, Kirkland; James K. Riley; Chih-Chau L. Kuan, both of Redmond, all of Wash.

[73] Assignee: NeoPath, Inc., Redmond, Wash.

[21] Appl. No.: 08/788,239

[22] Filed: Jan. 25, 1997

[51] Int. Cl.$^6$ .................................................. G06K 9/36
[52] U.S. Cl. .......................... 382/276; 382/224; 382/280; 382/296; 382/298; 382/308; 382/317
[58] Field of Search .................................. 382/276, 308, 382/280, 224, 296, 298, 317

[56] References Cited

U.S. PATENT DOCUMENTS

| | | | |
|---|---|---|---|
| 3,743,427 | 7/1973 | Weiser | 356/124 |
| 4,175,860 | 11/1979 | Bacus | 356/39 |
| 4,180,704 | 12/1979 | Pettit | 250/237 |
| 4,241,996 | 12/1980 | Weiser | 356/124.5 |
| 4,891,829 | 1/1990 | Deckman et al. | 378/4 |
| 4,965,725 | 10/1990 | Rutenberg | 364/413.1 |
| 4,991,093 | 2/1991 | Roberge et al. | 364/413.15 |
| 5,072,382 | 12/1991 | Kamentsky | 364/413.08 |
| 5,125,100 | 6/1992 | Katznelson | 455/6.1 |
| 5,170,433 | 12/1992 | Elliott et al. | 381/47 |
| 5,193,124 | 3/1993 | Subbarao | 382/255 |
| 5,206,919 | 4/1993 | Keating | 382/296 |
| 5,257,182 | 10/1993 | Luck et al. | 364/413.1 |
| 5,265,112 | 11/1993 | Noll et al. | 372/32 |
| 5,287,272 | 2/1994 | Rutenberg et al. | 364/413.1 |
| 5,315,700 | 5/1994 | Johnston et al. | 395/163 |
| 5,326,659 | 7/1994 | Liu et al. | 430/5 |
| 5,361,140 | 11/1994 | Hayenga et al. | 358/446 |
| 5,557,097 | 9/1996 | Ortyn et al. | 250/201.3 |

OTHER PUBLICATIONS

Marks II, Robert J., "Introduction to Shannon Sampling and Interpolation Theory", © 1991 Springer–Verlag, New York Inc., pp. 57, 68–83.

Smith, Warren J., "Modern Optical Engineering, The Design of Optical Systems", ©1996 McGraw–Hill, Inc., pp. 308–325.

*Primary Examiner*—Jose L. Couso
*Assistant Examiner*—Kanji Patel
*Attorney, Agent, or Firm*—Hans I. Sun; Emil Moffa

[57] ABSTRACT

Measurement of the optical transfer function of an optical system imaging a bar pattern. A one dimensional fast Fourier transform processes sampled image data from the bar pattern. A model of the system utilizes robust measurements of the period, duty cycle and center of each stripe in the pattern. A signal alias free optical transfer function is estimated from the plurality of one dimensional frequency representation of the signal. An idealized bar pattern synthesized from the measured parameters of period, duty cycle and the center of each stripe in the pattern generates an ideal optical transfer function. The noise reduced optical transfer function, OTF, is estimated from OTF of the signal and OTF of the synthesized bar pattern.

45 Claims, 12 Drawing Sheets

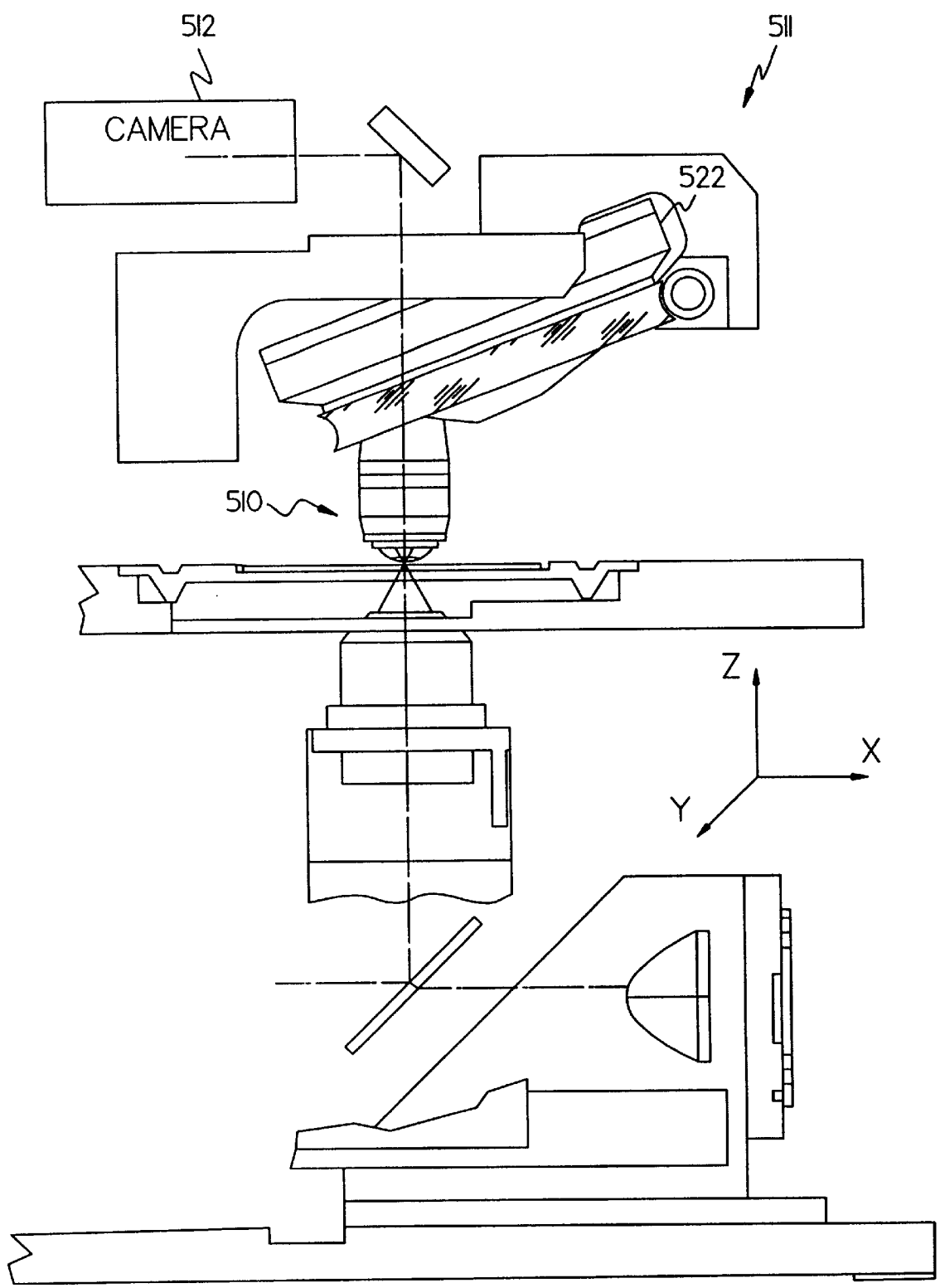
Fig_11C

METHOD AND APPARATUS FOR ALIAS FREE MEASUREMENT OF OPTICAL TRANSFER FUNCTION

The invention relates to the measurement of the optical transfer function of an optical system affected by sampling aliasing error.

BACKGROUND OF THE INVENTION

The measurement of the optical transfer function, OTF, of an optical system with sampled images may suffer from aliasing effects. Reducing the impact of these aliasing effects improves measurement accuracy. Previous work has been done by applying the two dimensional Fourier transform using a tilted one dimensional pattern. See applicant's U.S. Pat. No. 5,621,519, issued Apr. 15, 1997 to Frost et al., entitled "Imaging system Transfer function Control Method and Apparatus", which is incorporated herein by reference.

The output signal of a charge coupled device, CCD, sensor, is the spatially sampled version of the input signal to the CCD. The frequency representation of the spatially sampled version of the input signal suffers from an aliasing effect. This alias effect degrades the estimation of frequency measurements, especially, below and near the Nyquist frequency. In addition, the frequency components above the Nyquist frequency cannot be estimated.

In Frost et al. the rotated one dimensional pattern in small degree is employed. The two dimensional Fourier transform of the rotated one dimensional pattern lies in the line which is rotated through the same angle and passes through the origin. For this reason, in Frost et al. the frequency components over the Nyquist frequencies may be separated and the alias effects may be removed. However, this method needs a two dimensional Fast Fourier Transform, FFT, or equivalent. In many real-time implementations, an optimization process is needed to estimate the two dimensional FFT accurately. The two dimensional FFT may take an unacceptably long time and may suffer a loss in accuracy. The one dimensional FFT is faster than the two dimensional FFT and can be estimated with high precision in real time.

The OTF is a quantitative measure of the quality of an imaging system. In an imaging system that is to be used for automated image processing and analysis it is important to have a quantitative measure of the quality of the imaging system. This quantitative measure allows appropriate interpretation of other quantitative measures that are obtained using the imaging system. For example measurements taken with the optical system of the texture of objects, or optical density of objects will be affected by the optical system where the OTF is a measure of that effect. Thus the same objects imaged by two different optical systems may result in differing measurements. Also an unacceptably poor OTF may indicate a failure of the optical system to deliver adequate images suitable for further analysis.

SUMMARY OF THE INVENTION

The invention images a bar pattern then calculates the tilt angle, rotated angle of the bar pattern, the period, the duty cycle, and the center line of the stripes of the bar pattern. The invention provides estimates of OTF in noisy environments. Because the invention determines tilt, duty cycle, period and image shift, the optimization procedure is simple and accurate. Furthermore, the invention can estimate the center line of the stripes of the bar pattern which results in a more accurate estimation of the phase of the optical transfer function.

The invention provides a method of alias free measurement of an optical transfer function of an optical system with a test pattern wherein the test pattern comprises a tilt angle that is relative to a predetermined axis, a period, a duty cycle and a bar with a bar center line, the method comprising the steps of: imaging the test pattern with the optical system to generate an image of the test pattern wherein the image has a sampled signal representation; measuring the tilt angle from the sampled signal representation; measuring the period from the sampled signal representation; measuring the duty cycle from the sampled signal representation; measuring the bar center line from the sampled signal representation; calculating a plurality of one dimensional Fourier transforms of the sampled signal representation to generate a plurality of frequency representations; and determining the optical transfer function based on the plurality of frequency representations, the tilt angle, period, duty cycle, and bar center line.

The invention also provides for: synthesizing an ideal test pattern from the tilt angle, period, duty cycle and center line; calculating an ideal optical transfer function for the ideal test pattern; and calculating a noise reduced optical transfer function from the optical transfer function and the ideal optical transfer function.

The invention further provides a method where a tilt angle is determined by a minimization of a cost function.

The invention also provides a method of noise reduced alias free measurement of an optical transfer function of an optical system with a test pattern wherein the test pattern comprises a tilt angle that is relative to a predetermined axis, a period, a duty cycle and a bar with a bar center line, the method comprising the steps of: imaging the test pattern with the optical system to generate a sampled signal representation of the test pattern; calculating a first optical transfer function for the optical system, the period and tilt angle; synthesizing a synthesized test pattern from the tilt angle, period and optical transfer function; calculating a second optical transfer function for the synthesized test pattern test pattern; and calculating a noise reduced optical transfer function from the first optical transfer function and the second optical transfer function.

The invention further provides the steps of: computing a difference image from the sampled signal representation and the synthesized test pattern; and finding image defects in the sampled signal representation from the difference image.

The invention also provides that the step of finding image defects from the difference image further comprises the steps of: applying a difference threshold to the difference image in absolute value to produce a threshold image; and applying a morphological operation to find regions in the threshold image that exceed the difference threshold.

The invention provides an apparatus for alias free measurement of an optical transfer function of an optical system with a test pattern wherein the test pattern comprises a tilt angle that is relative to a predetermined axis, a period, a duty cycle and a bar with a bar center line, the apparatus comprising: means for imaging the test pattern with the optical system to generate an image of the test pattern wherein the image has a sampled signal representation, wherein the means for imaging the test pattern has a sampled signal representation output; means for measuring the tilt angle, connected to the sampled signal representation output, having a tilt angle output; means for measuring the period, connected to the sampled signal representation output, having a period output; means for measuring the duty cycle, connected to the sampled signal representation output, having a duty cycle output; means for measuring the bar center line, connected to the sampled signal representation output, having a bar center line output; means for calculating a plurality of one dimensional Fourier transforms, connected to the sampled signal representation output, having a plurality of frequency representations output; and means for determining the optical transfer function connected to the plurality of frequency representations output, the tilt angle output, period output, duty cycle output, and bar center line output, wherein the means for determining the optical transfer function has an optical transfer function output.

The invention further provides that the means for calculating a plurality of one dimensional Fourier transforms further comprises a digital signal processor and that the means for determining the optical transfer function further comprises a digital computer.

The invention further provides an apparatus for noise reduced alias free measurement of an optical transfer function of an optical system with a test pattern wherein the test pattern comprises a tilt angle that is relative to a predetermined axis, a period, a duty cycle and a bar with a bar center line, the apparatus comprising: means for imaging the test pattern with the optical system having a sampled signal representation of the test pattern output; means for calculating an optical transfer function for the optical system, connected to the sampled signal representation of the test pattern output, having a first optical transfer function output, a tilt angle output and period output; means for synthesizing a synthesized test pattern, connected to the first optical transfer function output, tilt angle output and period output, having a synthesized test pattern output; means for calculating a second optical transfer function for the synthesized test pattern, connected to the test pattern output, having a second optical transfer function output; and means for calculating a noise reduced optical transfer function, connected to the first optical transfer function output and second optical transfer function output, having a noise reduced optical transfer function output.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIGS. 11A, 11B and 11C show an example optical system in use with a biological specimen analysis system.

DETAILED DESCRIPTION OF THE PREFERRED EMBODIMENT

Figure 1:
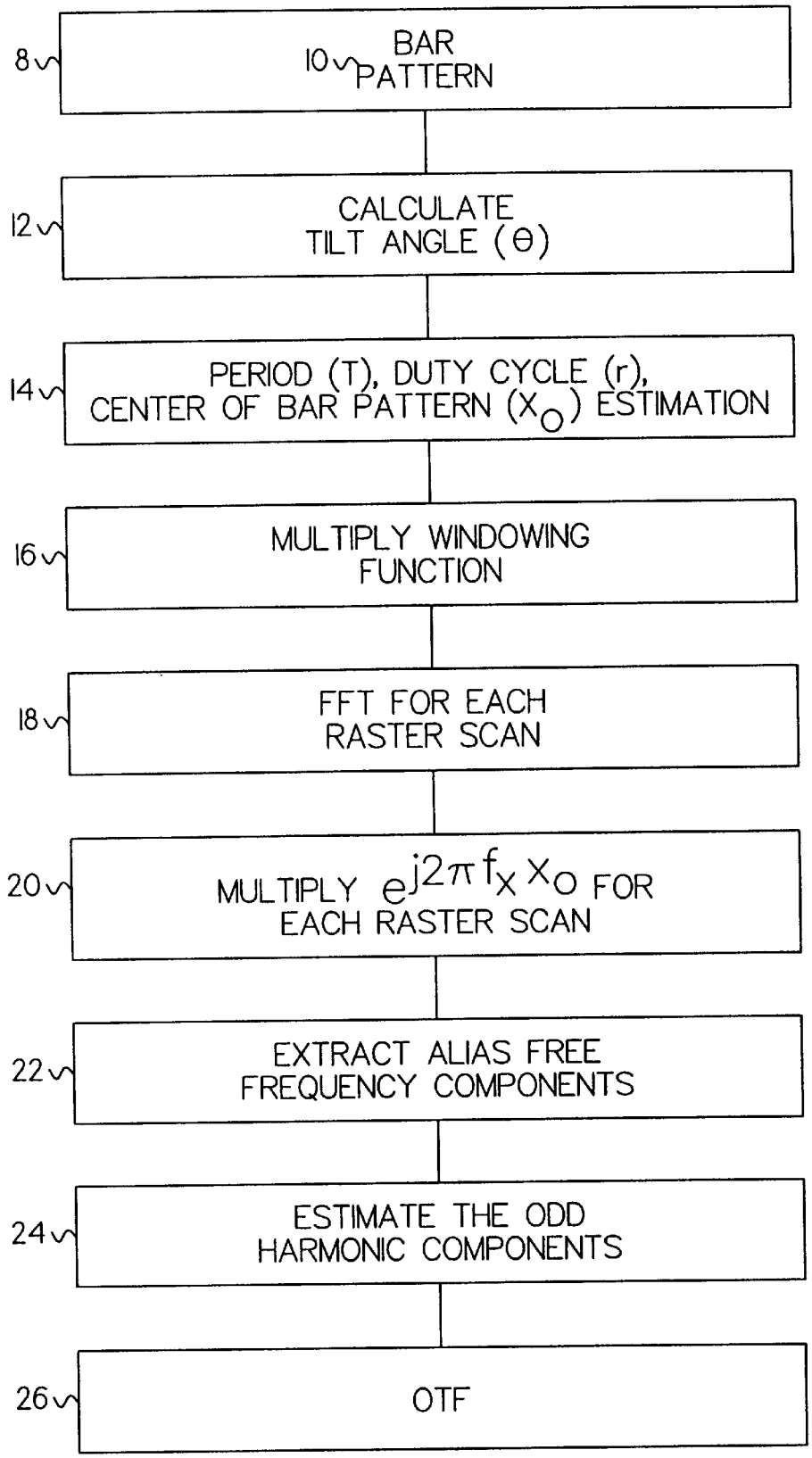
FIG. 1 shows the method and apparatus of the invention to compute the optical transfer function of an optical system.
Figure 6:
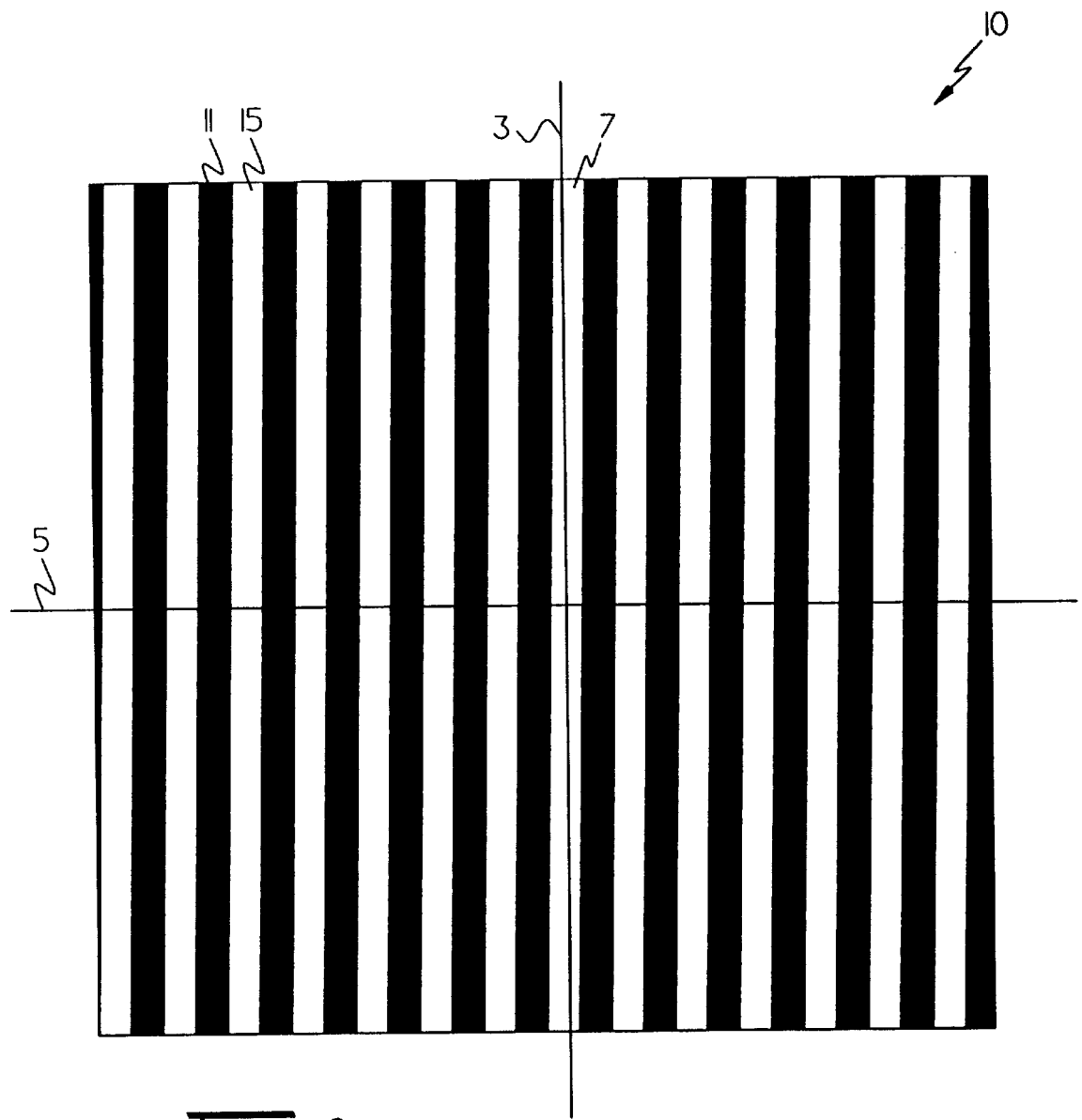
FIG. 6 shows an example bar pattern.
Figure 11A:
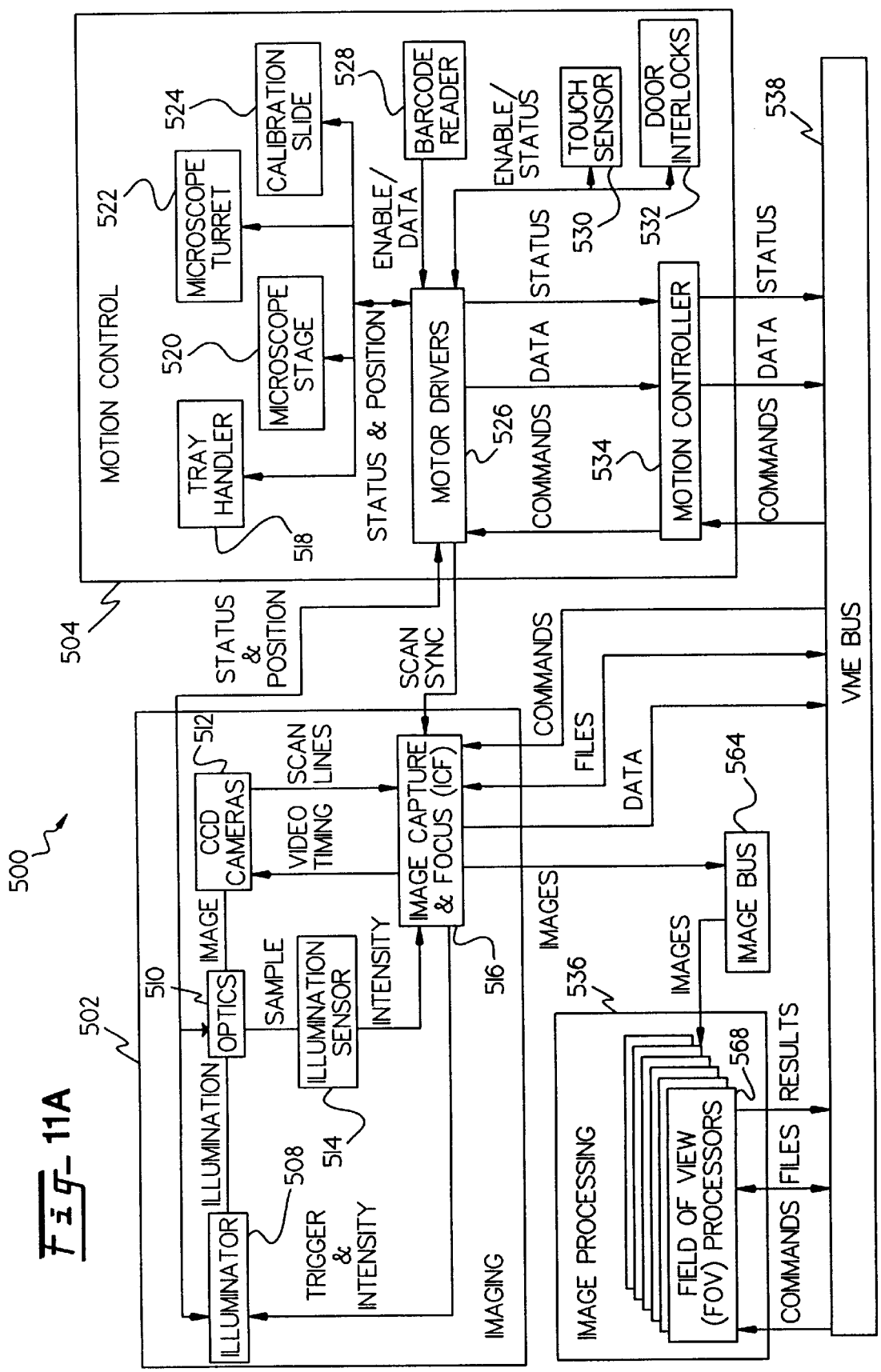
Figure 11B:
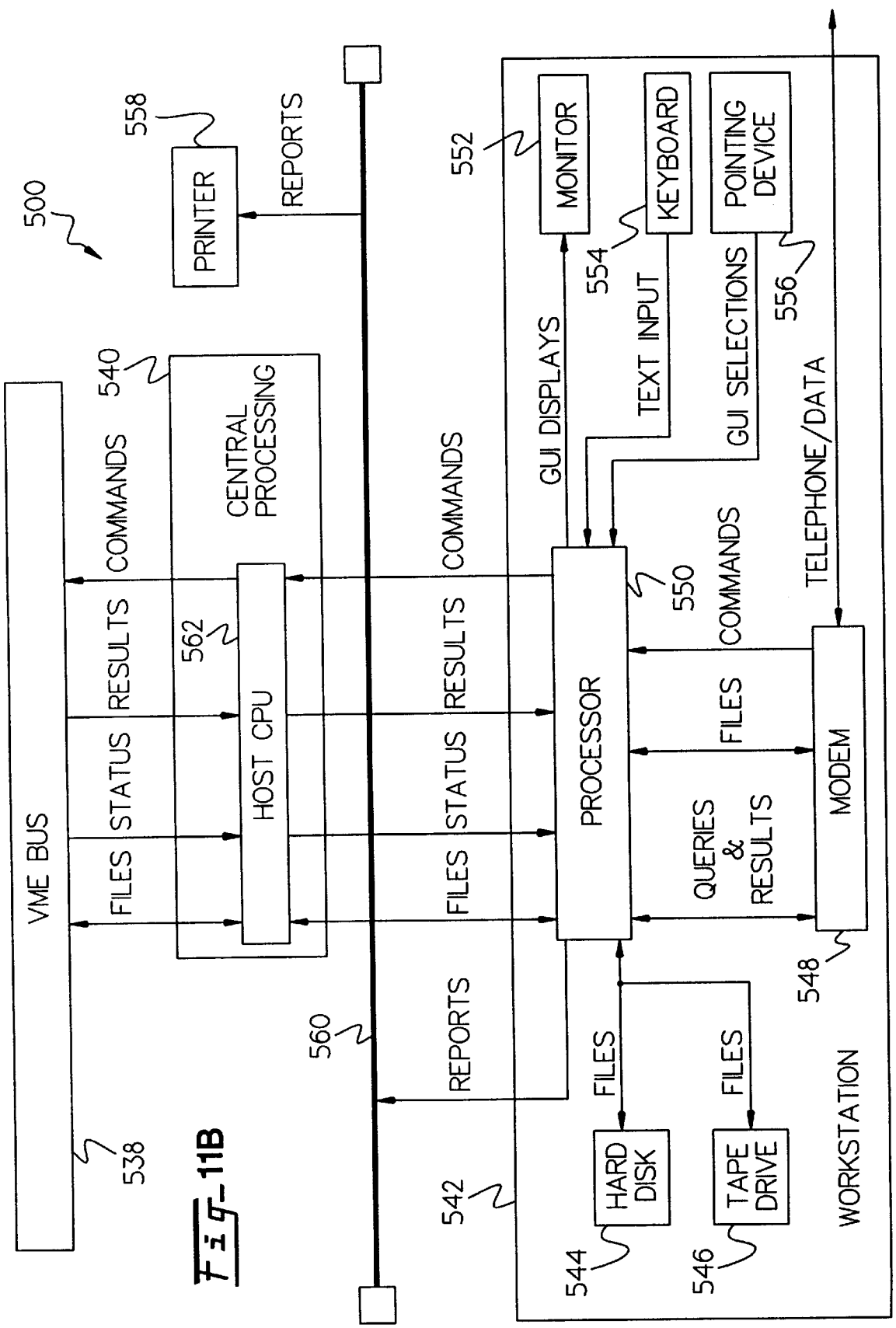

Refer now to FIG. 1 which shows the method and apparatus of the invention to compute the Optical Transfer Function 26 of an optical system. The invention calculates the Optical Transfer Function, OTF, of an optical system based on the one dimensional Fast Fourier Transform, FFT. The one dimensional Fourier transform can be computed by a variety of methods, including the use of a digital signal processor, DSP, to quickly calculate the Fourier transform in real time on a sampled signal. In the method and apparatus, bar pattern 10, shown in FIG. 6, is imaged with the optical system to be measured. An ideal test pattern could be uniquely described by its tilt, period, duty cycle and the center line of each stripe. An example optical system is shown in FIGS. 11A, 11B and 11C as employed in a biological specimen analysis system. The method and apparatus assumes a function $s_0(x,y)$ to be a data representation of the image of a two dimensional pattern that is uniform in one dimension. The function $s_0(x,y)$ is defined in the spatial domain with an x,y coordinate system, a column-row system. The method and apparatus of the invention also defines a one-dimensional pattern function $b_0(x)$ that may be rotated by the tilt angle $\theta$. The test pattern thus has a predetermined axis along which the pattern does not vary. As a result the image of the pattern 10 may be described by the function $s_0(x,y)=b_0(x\cos\theta - y\sin\theta)$. In one example embodiment, the pattern is a bar pattern. The image of the bar pattern is blurred by the imaging system. The OTF is a measure of the blur. The method and apparatus of the invention starts with imaging the pattern 10 in step 8. Next the method and apparatus of the invention determines the tilt angle $\theta$ of the pattern 10 in step 12 by minimizing a cost function. The tilt angle $\theta$ estimation proceeds by finding the value of $\theta$ that minimizes the following cost function:

$$Cost = \frac{1}{N}\sum_{i=1}^{N}\int\left[s_0(x-\tau y_i, y_i) - \frac{1}{N}\sum_{j=1}^{N}s_0(x-\tau y_j, y_j)\right]^2 dx$$

where
$\tau=\tan\theta$
$i=i^{th}$ row
N=number of rows of the image
$y_i$=position of the $i^{th}$ row.

There are many methods known in the art to minimize a cost function including: the gradient descent method; the conjugate gradient descent method; Newton's method; the golden sectioning method; or the interval halving method.

The accuracy of the tilt angle calculation affects the accuracy of all subsequent steps. After the tilt angle calculation in step 12, the invention calculates the period, the duty cycle and the center line of the bar pattern stripe in step 14. Step 14 is shown in more detail in FIG. 2.

In step 16 a windowing function w(x) is multiplied by the raster signal $s_0(x,y)$ to reduce the leakage of the frequency component of the signal in the frequency domain. This generates a modified signal:

$$\hat{s}(x,y) = w(x-\tau y)s_0(x,y).$$

In one example embodiment, the windowing function w(x) takes the following form:

$$w(x) = \begin{cases} \cos^2\left(\frac{\pi x}{L}\right) & : -\frac{L}{2} \leq x \leq \frac{L}{2} \\ 0 & : \text{otherwise} \end{cases}$$

the Fourier transform $W(f_x)$ of $w(x)$ is:

$$W(f_x) = \frac{1}{2}\text{sinc}(f_x L) + \frac{1}{4}\text{sinc}(1 + f_x L) + \frac{1}{4}\text{sinc}(1 - f_x L)$$

where $$\text{sinc}(x) = \frac{\sin(\pi x)}{\pi x}$$

and where L is the size of the windowing function in the x direction, for example. Noise in the input signal may also adversely affect the measurement of OTF. In addition, shifts in the image's center are obscured in the frequency domain which affects the phase angle of the OTF.

With the method and apparatus of the invention, simple and accurate estimation of the optical transfer function and frequency response may be achieved with a reduction in the effects of noise. Also, several of the parameters such as the tilt angle, the period, and the duty cycle while calculated simultaneously in the prior art are estimated separately with high precision in the invention. Also the invention computes the center line of each bar pattern stripe.

The one dimensional Fourier transform is applied to the modified signal $\hat{s}(x,y)$ in step 18 to generate a plurality of frequency representations $\hat{S}_x(f_x,y)$ where $f_x$ is the spatial frequency.

In step 20 the plurality of one dimensional Fourier transforms are multiplied by $$e^{j2\pi f_x X_o}$$

for each raster scan to compensate the center of the bar pattern, where $X_o$ is the x position of the center of the center line of the entire image described in more detail below. Let $S_x(f_x,y)$ represent the spectral representation, Fourier transform, of $\hat{s}(x-X_0,y)$ $$S_x(f_x,y) = \hat{S}_x(f_x,y)e^{j2\pi f_x X_o}.$$

Also define the Fourier transform of s(x,y) in the x direction as $S_x(f_x,y)$. $S_x(f_x,y)$ is then described by the following equation:

$$S_x(f_x, y) = \qquad (1)$$
$$\int s(x,y)\exp(-j2\pi f_x x)dx = \int b(x\cos\theta - y\sin\theta)\exp(-j2\pi f_x X)dx$$

$$S_x(f_x, y) = \frac{\exp(-j2\pi f_x y\tan\theta)}{\cos\theta} B\left(\frac{f_x}{\cos\theta}\right)$$

and $$B(f_x) = \int b(x)\exp(-j2\pi f_x x)dx$$

where $B(f_x)$ is the Fourier transform of $b(x)$. $b(x)$ is the bar pattern which is multiplied by the windowing function $w(x)$ at $b_0(x)$ and is compensated at the center of image $X_0$.

The method and apparatus of the invention then assumes that the tilt angle is very small, that is, $\theta \ll 1$. Equation (1) becomes:

$$S_x(f_x,y0) = \exp(-j2\pi f_x y\tan\theta)B(f_x) \qquad (2)$$

The image signal of the bar pattern 10 is sampled in the x direction by the interval of X, the size of an imaging pixel. The sampled signal, representing an acquired image of the test pattern, is described by:

$$s(x,y) = \sum_{n=-\infty}^{\infty} s(nX, y)\delta(x - nX)$$

where $\Lambda_x = 1/X$ is the sampling frequency and where $\delta(x)$ is the Dirac delta function. When $\theta = 0$, then equation (2) becomes:

$$S_x(f_x, y) =$$
$$\sum_{n=-\infty}^{\infty} S_x(f_x + n\Lambda_x, y) = \sum_{n=-\infty}^{\infty} B(f_x + n\Lambda_x)\exp[-j2\pi(f_x + n\Lambda_x)y\tan\theta]$$

$$S_x(f_x, y) = \sum_{n=-\infty}^{\infty} B(f_x + n\Lambda_x)$$

and the meaningful range is $-\Lambda_x/2 \leq f_x < \Lambda_x/2$ which spans one period of the function $f_x$. From the above equation, $B(f_x)$ cannot be calculated from the $S_x(f_x,y)$. However, if it is assumed that $\theta \neq 0$, then $B(f_x)$ can be estimated from the $S_x(f_x,y)$. If equation (2) is modified by the above assumption, then:

$$S_x(f_x, y)\exp[j2\pi f_x y\tan\theta] = \sum_{n=-\infty}^{\infty} B(f_x + n\Lambda_x)\exp[-j2\pi n\Lambda_x y\tan\theta] \qquad (3)$$

If $S_x(f_x,y_1), S_x(f_x,y_2), \ldots, S_x(f_x, y_k), \ldots$ is known where $$0 \leq y_1 \Lambda_x \tan\theta < \ldots < y_k \Lambda_x \tan\theta < \ldots < 1$$

equation (3) may be rewritten as:

$$\begin{bmatrix} \ldots \exp[j\alpha y_1] \, 1 \, \exp[-j\alpha y_1] \ldots \\ \ldots \exp[j\alpha y_2] \, 1 \, \exp[-j\alpha y_2] \ldots \\ \vdots \\ \ldots \exp[j\alpha y_k] \, 1 \, \exp[-j\alpha y_k] \ldots \\ \vdots \end{bmatrix} \begin{bmatrix} \vdots \\ B(f_x - \Lambda_x) \\ B(f_x) \\ B(f_x + \Lambda_x) \\ \vdots \end{bmatrix} = \qquad (4)$$

$$\begin{bmatrix} S_x(f_x, y_1)\exp(j2\pi f_x y_1\tan\theta) \\ S_x(f_x, y_2)\exp(j2\pi f_x y_2\tan\theta) \\ \vdots \\ S_x(f_x, y_k)\exp(j2\pi f_x y_k\tan\theta) \\ \vdots \end{bmatrix}$$

where $$\alpha = 2\pi\Lambda_x\tan\theta \text{ and } -\Lambda_x/2 \leq f_x < \Lambda_x/2.$$

From equation (4), if the first matrix is a square matrix, then that matrix is not singular, therefore, the solution of equation (4) exists. This solution gives the alias free estimation of $B(f_x)$ which is the frequency representation of $b(x)$.

For example, if the signal $b(x)$ is band limited at $2\Lambda_x$, that is, $B(f_x)=0$ when $|f_x|>2\Lambda_x$, then equation (4) becomes:

$$\begin{bmatrix} \exp[j2\alpha y_1] & \exp[j2\alpha y_1] & 1 & \exp[-j\alpha y_1] & \exp[-j2\alpha y_1] \\ \exp[j2\alpha y_2] & \exp[j2\alpha y_2] & 1 & \exp[-j\alpha y_2] & \exp[-j2\alpha y_2] \\ \exp[j2\alpha y_3] & \exp[j2\alpha y_3] & 1 & \exp[-j\alpha y_3] & \exp[-j2\alpha y_3] \\ \exp[j2\alpha y_4] & \exp[j2\alpha y_4] & 1 & \exp[-j\alpha y_4] & \exp[-j2\alpha y_4] \\ \exp[j2\alpha y_5] & \exp[j2\alpha y_5] & 1 & \exp[-j\alpha y_5] & \exp[-j2\alpha y_5] \end{bmatrix}$$

$$\begin{bmatrix} B(f_x - 2\Lambda_x) \\ B(f_x - \Lambda_x) \\ B(f_x) \\ B(f_x + \Lambda_x) \\ B(f_x + 2\Lambda_x) \end{bmatrix} = \begin{bmatrix} S_x(f_x, y_1)\exp(j2\pi f_x y_1\tan\theta) \\ S_x(f_x, y_2)\exp(j2\pi f_x y_2\tan\theta) \\ S_x(f_x, y_3)\exp(j2\pi f_x y_3\tan\theta) \\ S_x(f_x, y_4)\exp(j2\pi f_x y_4\tan\theta) \\ S_x(f_x, y_5)\exp(j2\pi f_x y_5\tan\theta) \end{bmatrix}$$

Note that the first matrix is non singular, so the solution of the above equation exists and the function $B(f_x)$ can be estimated.

In an alternate embodiment, the function $B(f_x)$ may be estimated from the over determined case because there is data from many rows. The invention estimates the frequency component of the $B(f_x)$ by minimizing a cost function. The invention defines the cost function to estimate the $B(f_x)$ to be the following function:

$$Cost = \int \sum_{i=0}^{N} r(i) \left| \sum_n (B(f_x + n\Lambda_x)\exp\{-j2\pi(f_x+n\Lambda_x)y_i\tan\theta\}) - S_x(f_x, y_i) \right|^2 df_x \quad (5)$$

where $r(i)$ is the weight value for the cost function for the $i^{th}$ row. The above equation is minimized by satisfying the following equation for each $f_x$:

$$\sum_{i=0}^{N} r(i) \sum_n B(f_x + n\Lambda_x)\exp\{-j2\pi(n-k)\Lambda_x y_i\tan\theta\} = \quad (6)$$

$$\sum_{i=0}^{N} r(i)S_x(f_x, y_i)\exp\{j2\pi(f_x+k\Lambda_x)y_i\tan\theta\}$$

$$\begin{bmatrix} \vdots & \vdots & \vdots & \vdots & \vdots \\ \cdots & \varphi(-1,-1) & \varphi(0,-1) & \varphi(1,-1) & \cdots \\ \cdots & \varphi(-1,0) & \varphi(0,0) & \varphi(1,0) & \cdots \\ \cdots & \varphi(-1,1) & \varphi(0,1) & \varphi(1,1) & \cdots \\ \vdots & \vdots & \vdots & \vdots & \vdots \end{bmatrix} \begin{bmatrix} \vdots \\ B(f_x - \Lambda_x) \\ B(f_x) \\ B(f_x + \Lambda_x) \\ \vdots \end{bmatrix} = \begin{bmatrix} \vdots \\ \xi(f_x,-1) \\ \xi(f_x,0) \\ \xi(f_x,1) \\ \vdots \end{bmatrix}$$

where $$\varphi(n,k) = \sum_{i=0}^{N} r(i)\exp\{-j2\pi(n-k)\Lambda_x y_i\tan\theta\}$$

and $$\xi(f_x,k) = \sum_{i=0}^{N} r(i)S_x(f_x, y_i)\exp\{j2\pi(f_x+k\Lambda_x)y_i\tan\theta\}.$$

The solution of equation (6) minimizes equation (5). The range of the matrix is determined by the frequency range. For example, if the signal $b(x)$ is band limited to $2\Lambda_x$, that is $B(f_x)=0$ when $|f_x|>2\Lambda_x$, then equation (6) becomes:

$$\begin{bmatrix} \varphi(-2,2) & \varphi(-1,-2) & \varphi(0,-2) & \varphi(1,-2) & \varphi(2,-2) \\ \varphi(-2,-1) & \varphi(-1,-1) & \varphi(0,-1) & \varphi(1,-1) & \varphi(2,-1) \\ \varphi(-2,0) & \varphi(-1,0) & \varphi(0,0) & \varphi(1,0) & \varphi(2,0) \\ \varphi(-2,1) & \varphi(-1,1) & \varphi(0,1) & \varphi(1,1) & \varphi(2,1) \\ \varphi(-2,2) & \varphi(-1,2) & \varphi(0,2) & \varphi(1,2) & \varphi(2,2) \end{bmatrix} \begin{bmatrix} B(f_x - 2\Lambda_x) \\ B(f_x - \Lambda_x) \\ B(f_x) \\ B(f_x + \Lambda_x) \\ B(f_x + 2\Lambda_x) \end{bmatrix} = \begin{bmatrix} \xi(f_x,-2) \\ \xi(f_x,-1) \\ \xi(f_x,0) \\ \xi(f_x,1) \\ \xi(f_x,2) \end{bmatrix}$$

Equation (6) is then used to solve for $B(f_x)$. $B(f_x)$ is the alias free frequency component. Using equation (6), the alias free signal in frequency domain is obtained in step 22. Because the windowing function is given, the alias free frequency components, amplitude and phase, for each harmonic are calculated from the best fitting to desired shape of the Fourier transformed windowing function in step 24 to result in the estimation of the OTF 26. In step 24, the windowing function is represented by $w(x)$. The Fourier transform of the windowed signal is:

$$W*S_0(f_x,y) = \int W(f)S_0(f_x-f,y)df$$

where $W(f)$ is the Fourier transform of the shifted and rotated windowing function $w(x-X_0-\tau y)$. Because $s_0(x,y)$ is one dimensional blurred bar pattern, the Fourier transform of the windowed signal is:

$$W * S_0(f_x, y) = \sum_{n=0}^{\infty} \int W(f_x - f)\alpha_n \delta(f - nf_0) df = \sum_{n=0}^{\infty} \alpha_n W(f_x - nf_0)$$

where $\alpha_n$ is the $n^{th}$ harmonic component of the image. If $W(f)=0$ when $$\frac{|f| < f_0}{2},$$

where $f_o$ is $1/T$ where T is the period of the bar pattern, then the Fourier transform of the windowed signal is $\alpha_n W(f_x - nf_0)$ for $(n-\frac{1}{2})f_0 < f_x < (n+\frac{1}{2})f_0$. Because the windowing function is known, the coefficient $\alpha_n$ can be estimated from the minimization of the following cost function at the grid of the FFT domain:

$$Cost_n = \sum_{f_x \in N} |\alpha_n W(f_x - nf_0) - B(f_x)|^2$$

where n is an interval containing $nf_0$. From given $\alpha_n$, the OTF of $nf_0$ is:

$$OTF_{nf_0} = \frac{\pi n \alpha_n}{\sin(\pi n r)} \cdot \frac{r}{\alpha_0}$$

because the optical transfer function at zero frequency, $OTF_0$, equals 1 by definition.

Figure 2:
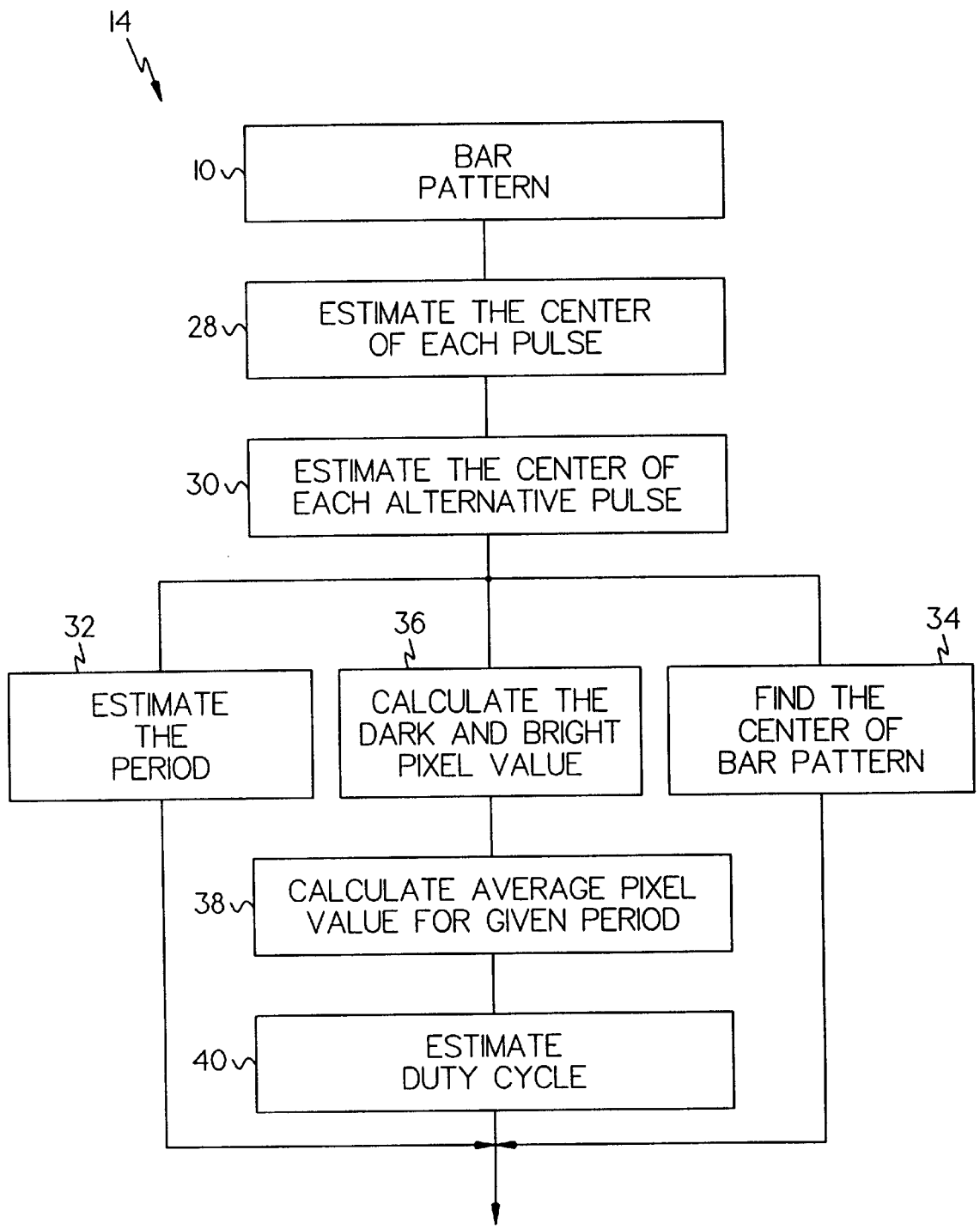
FIG. 2 shows the method and apparatus of the invention to estimate the period of stripes on a test pattern, the duty cycle of the stripes of the test pattern and the center line of the stripes of the test pattern.

Now refer to FIG. 2 which shows step 14 of the method and apparatus of the invention to calculate the period, the duty cycle, and the center of the signal in more detail. The bar pattern is imaged in step 8 where an image signal is created representing the image of the bar pattern. In step 28 the center of each pulse in the image signal is estimated. The method and apparatus of the invention calculates the center line of a single pulse. A pulse in the signal corresponds to a dark or bright region in the bar pattern. The center line of a single pulse, $X^{(n)}_k$, center of $k^{th}$ single pulse and $n^{th}$ iteration of procedure, is defined as the centroid of the signal with the symmetric windowed function. Thus, $$X_k^{(n+1)} = \frac{\int x \psi(x - X_k^{(n)}) s_0(x, y) dx}{\int \psi(x - X_k^{(n)}) s_0(x, y) dx}$$

where $\psi(x)=\psi(-x)$ for fixed y and $X_k$ is the convergence of the sequence for the kth dark or bright region. Next, the invention finds $X_k$. The relation is defined as follows.

$$q = \int x\psi(x-p)s_0(x,y)dx / \int \psi(x-p)s_0(x,y)dx - p.$$

Figure 3:
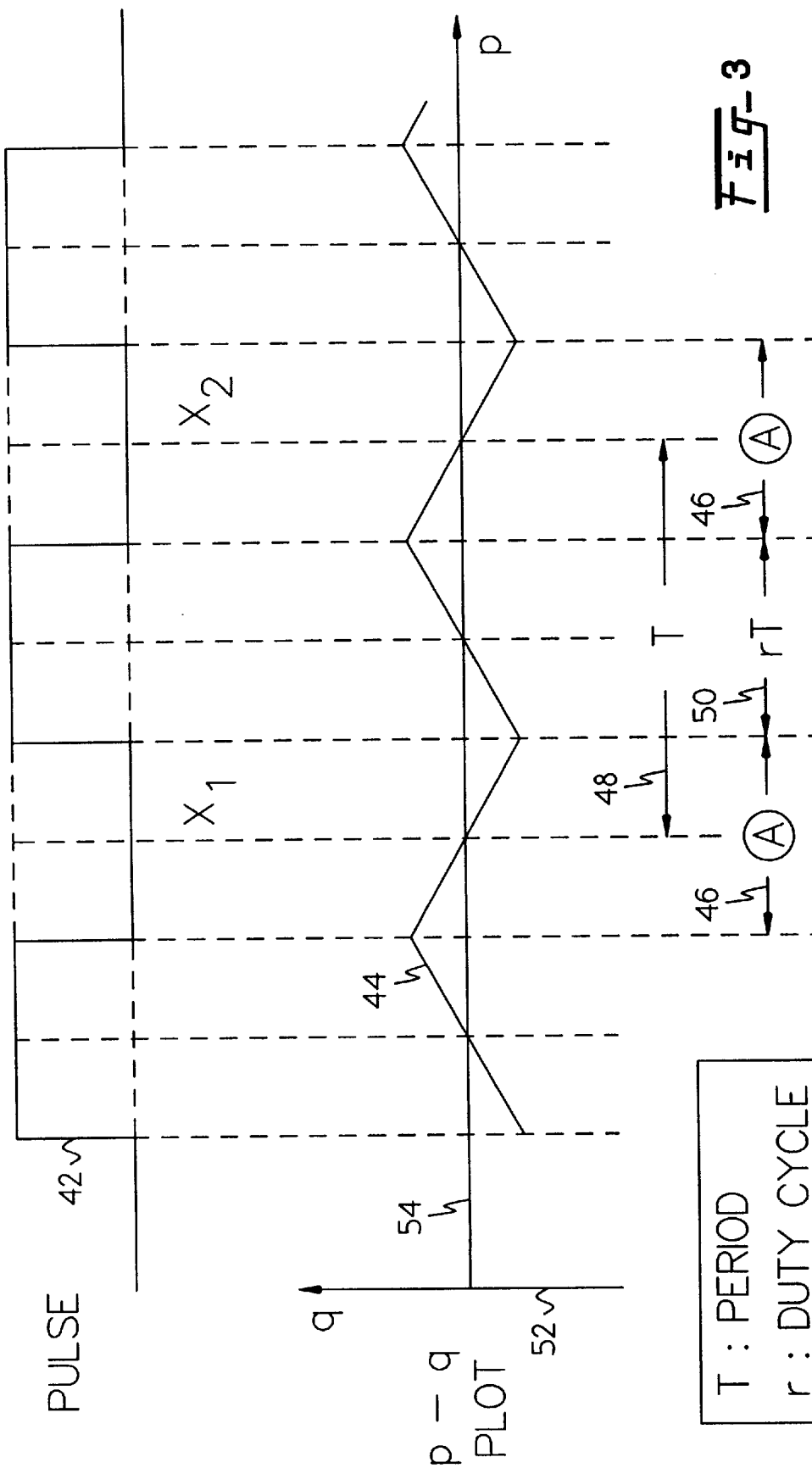
FIG. 3 shows a plot of the period and duty cycle of the test pattern.

FIG. 3 shows a plot of signal pulses 42 with the values 44 of q for given p along the x axis 54 with values of q on y axis 52. The period 48 T spans center line x1 to center line x2 both in the dark regions 46. When an iterative method is applied in the negative slope region 46, the operation $$\int x\psi(x - X_k^{(n)}) s_0(x, y) dx \bigg/ \int \psi(x - X_k^{(n)}) s_0(x, y) dx \to X_k$$

converges. As shown in FIG. 3, the negative slope occurs in every dark region 46. In general, the function $\psi$, where $\psi(x)=\psi(-x)$, will guarantee that all dark regions have negative slope or all bright regions have negative slope, for all regions. The interval 50 is the duty cycle times the period, rT. The invention assumes that $\psi(x)=\psi(-x)$ which allows the detection of the center of each dark region; these centers correspond to step 28. After the center for each dark/bright region is determined, the centers of each bright/dark region is determined from the midpoint from the adjacent centers of the dark/bright regions which correspond to the alternative pulse in step 30.

Return now to FIG. 2. The process then flows to step 30 where the center of each alternative pulse is calculated. From the estimates of the center of each pulse, step 28, and alternate pulse, the period of the bar pattern is calculated in step 32, as well as the center of the entire bar pattern, step 34.

Refer now to FIG. 6, the center of the image 3, $X_0$, is the value of the center of the center line of the bright single bar 7 which locates the nearest middle 5 at $Y_c$ in the image where $Y_c$ is the middle position in y direction. As shown in FIG. 3, the average distance between the centers of adjacent dark/white bars is the period (T). The averaging of the center distances method provides the robust measurement of the period of the bar pattern in step 32. The dark, $s_{min}$, and bright, $s_{max}$ pixel values of the image signal are calculated in step 36. The method and apparatus of the invention then flows to step 38 to calculate the average pixel value for a given period. Ave(s) is the average of the sum of all pixel values in an interval containing complete periods divided by the number of pixels in the interval.

The method and apparatus of the invention then calculates the duty cycle of the bar pattern in step 40. The average pixel value, Ave(s), of the bar pattern for a period is also defined as:

$$Ave(s) = s_{min} + r(s_{max} - s_{min})$$

where r is the duty cycle and $s_{min}$ and $s_{max}$ are the dark and bright pixel values, respectively. The value $s_{min}$ or $s_{max}$ is obtained from the average pixel values at the center line of each dark or bright bar or the average of the neighbor of the center line of the dark or bright bar. From this procedure, the duty cycle is:

$$r = \frac{Ave(s) - s_{min}}{s_{max} - s_{min}}.$$

Figure 4:
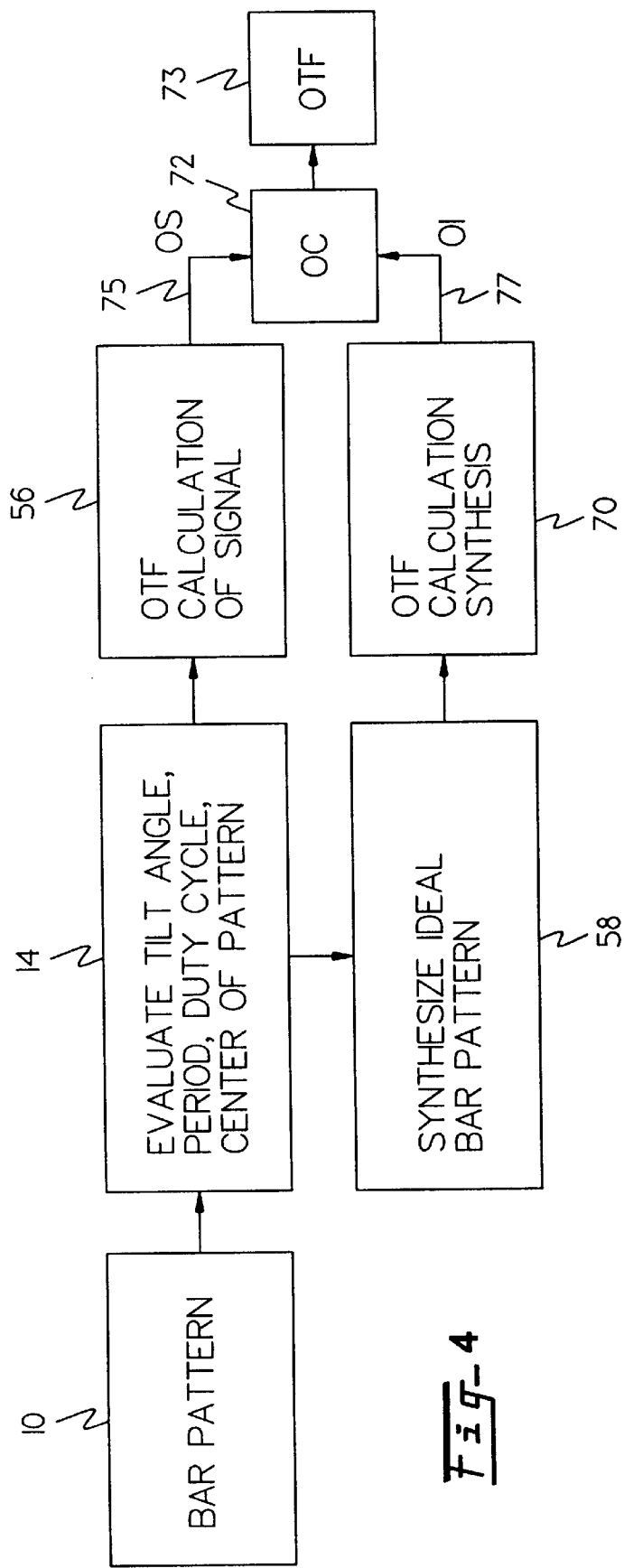
FIG. 4 shows the method and apparatus of the invention to compute the optical transfer function based on a synthesized ideal test pattern.

Refer now to FIG. 4 which shows the method and apparatus of the invention to calculate the noise reduced OTF 73 based on a measured OTF 75 for the bar pattern and an OTF 77 for a synthesized ideal test pattern. The tilted ideal test pattern can be synthesized by the given tilt angle, period, duty cycle, and center line of the bar pattern which were all estimated using the methods described above. The method and apparatus of the invention provides an estimate of the ideal optical transfer function from a synthesized ideal test pattern. The noise reduced OTF is determined by the equation $$OC_{nf_0} = \frac{OS_{nf_0}}{OI_{nf_0}} \cdot \frac{\sin(n\pi X f_0)}{n\pi X f_0}$$

where $OC_{nf_0}$ is the noise reduced OTF at $nf_0$ frequency, $OS_{nf_0}$ is the OTF determined from the original signal, and $OI_{nf_0}$ is the ideal OTF estimate determined from the synthesized ideal test pattern.

The bar pattern is imaged in step 8. The tilt angle, period and duty cycle of the bar pattern as well as the center of the bar pattern stripes is measured in step 14. In step 56 the $OS_{nf_0}$ for the bar pattern is calculated. From the measurements of step 14, a synthesized ideal test pattern is created in step 58. In step 70 the $OI_{nf_0}$ for the synthesized ideal test pattern is calculated. In step 72 the $OS_{nf_0}$ and $OI_{nf_0}$ are used to calculate the noise reduced alias free $OC_{nf_0}$ measurement of the system.

The synthesized ideal test pattern is described by:

$$I(x, y) = \left\{ [B_P(x, y; T, X_0, r, \tau) * P(x, y)] \sum_m \sum_n \delta(x - mX, y - nY) \right\} * P(x, y);$$

where the bar pattern function $B_p$ is $$B_P(x, y; T, X_0, r, \tau) = \pi\left(\frac{x - \tau(y - Y_c)}{rT}\right) * \sum_m \delta(x - mT - X_0, y);$$

the sampling function is $$\delta(x, y) = \begin{cases} 1 & \text{if } x = y = 0 \\ 0 & \text{else} \end{cases};$$

the bar function is $$\pi\left(\frac{x}{\alpha}\right) = \begin{cases} 1 & \text{if } -\frac{\alpha}{2} \leq x \leq \frac{\alpha}{2} \\ 0 & \text{else} \end{cases};$$

the pixel function is $$P(x, y) = \pi\left(\frac{x}{X}\right)\pi\left(\frac{y}{Y}\right);$$

and the other parameters are:
X,Y are the spacial sampling dimensions,
T is the period,
$X_0$ is the centerline,
r is the duty cycle,
$Y_c$ is the center of the sampled image in the y dimension,
$\tau$ is the $\tan(\theta)$ and $\theta$ is the tilt angle, and
* is the two dimensional convolution operator.

Figure 5:
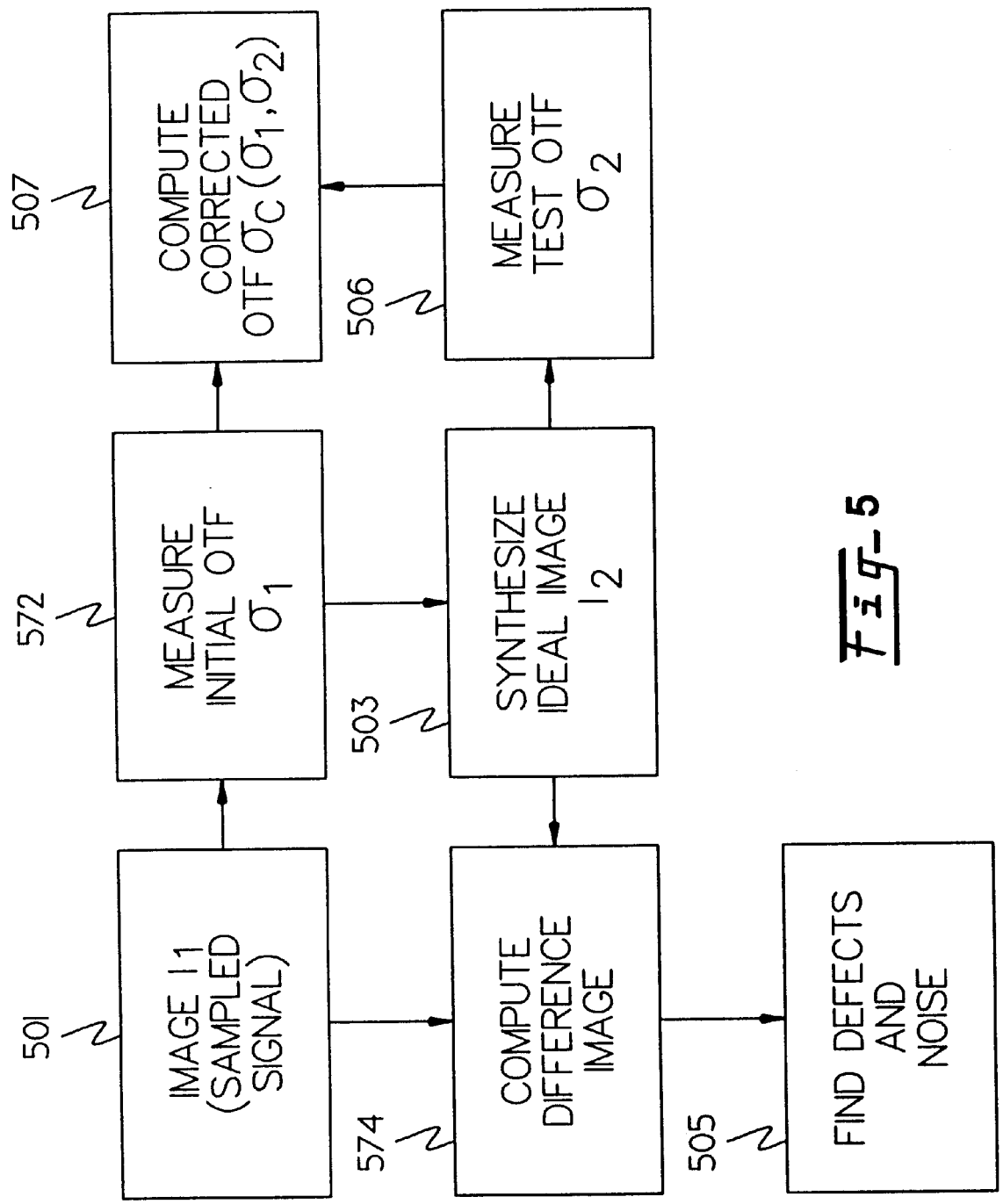
FIG. 5 shows the method and apparatus of the invention to find defects and noise in the image based on a synthesized bar pattern.

Refer now to FIG. 5 which shows another method and apparatus of the invention to calculate the OTF based on the measured OTF's of the imaged bar pattern $I_1$, and a synthesized bar pattern image $I_2$. In this method and apparatus, the synthesized bar pattern image $I_2$ is not produced with an ideal OTF=1, but with the measured OTF $O_1$, of the imaged bar pattern $I_1$. Using this method and apparatus, the invention identifies elements of the image which may represent defects in the test target, and find the noise in the image, by measuring the residual difference between the synthesized image and the actual image. In step 501, the original image $I^1$ is generated by the optical system from the test target. In step 572, the OTF $O_1$ of the optical system is measured from this image, as discussed above. In step 503, an ideal image $I_2$ is synthesized using $O_1$, the measured tilt angle, period, duty cycle, and center line of the bar pattern, estimated in step 572 by the methods described above. The ideal image $I_2$ can be described by:

$$I_2(x, y) = \sum_n A_n \cos(2\pi n f_0(x - \tau(y - Y_c) - X_0) + \phi_n)$$

where
$A_n$ is the magnitude of the $n^{th}$ harmonic,
$\phi_n$ is the phase of the $n^{th}$ harmonic,
$f_0$ is the reciprocal of the period, 1/T,
$\tau$ is the $\tan(\theta)$,
$\theta$ is the tilt angle,
$Y_c$ is the center of the image in y,
$X_0$ is the center line,
and where the magnitude and phase of the $n^{th}$ harmonic $A_n$ are defined by $$A_n e^{j\phi_n} = OTF_{nf_0} \frac{\sin(\pi r n)}{\pi r n}.$$

In step 574, the synthesized image $I_2$ is compared to the input image $I_1$ in order to characterize the noise. In particular, a difference image $I_d = I_1 - I_2$ is generated.

In step 505, the difference image $I_d$ is used to either find defects in the test pattern or optical system, or to measure the amount of noise. The noise may be measured by summing the variance $$\sigma^2 = \sum_{x,y} |I_d(x, y)|^2.$$

The defects in the imaging may be found by applying, for example, a difference threshold to the difference image in absolute value to produce a threshold image, followed by a morphological operation, such as an opening, to find regions that exceed the difference threshold in the absolute value difference image. These regions signal defects in the imaging system or test pattern.

In step 506, the synthesized image $I_2$ is fed through the same process of OTF determination that was applied to the original image $I_1$ in step 572. This time, the resulting OTF $O_2$ may be used to estimate the error made when measuring the original OTF $O_1$, and to correct it in step 507. Depending on the assumptions made regarding the noise introduced in measurement, different corrections may be made. For example, for additive noise, the correct OTF $O_c$ may be estimated as $$O_c = 2O_1 - O_2.$$

Or, for multiplicative errors, we may use the form $$O_c = O_1^2 / O_2.$$

For the purpose of illustration and not limitation an example of a tilted bar pattern is shown in FIG. 6. FIG. 6 shows a test pattern with dark bars 11 and light bars 15. The estimated tilt angle is −0.01992, the period is 36.50 pixels, the duty cycle 0.5157, and the center line of bar pattern is 268.26 pixels.

Figure 7:
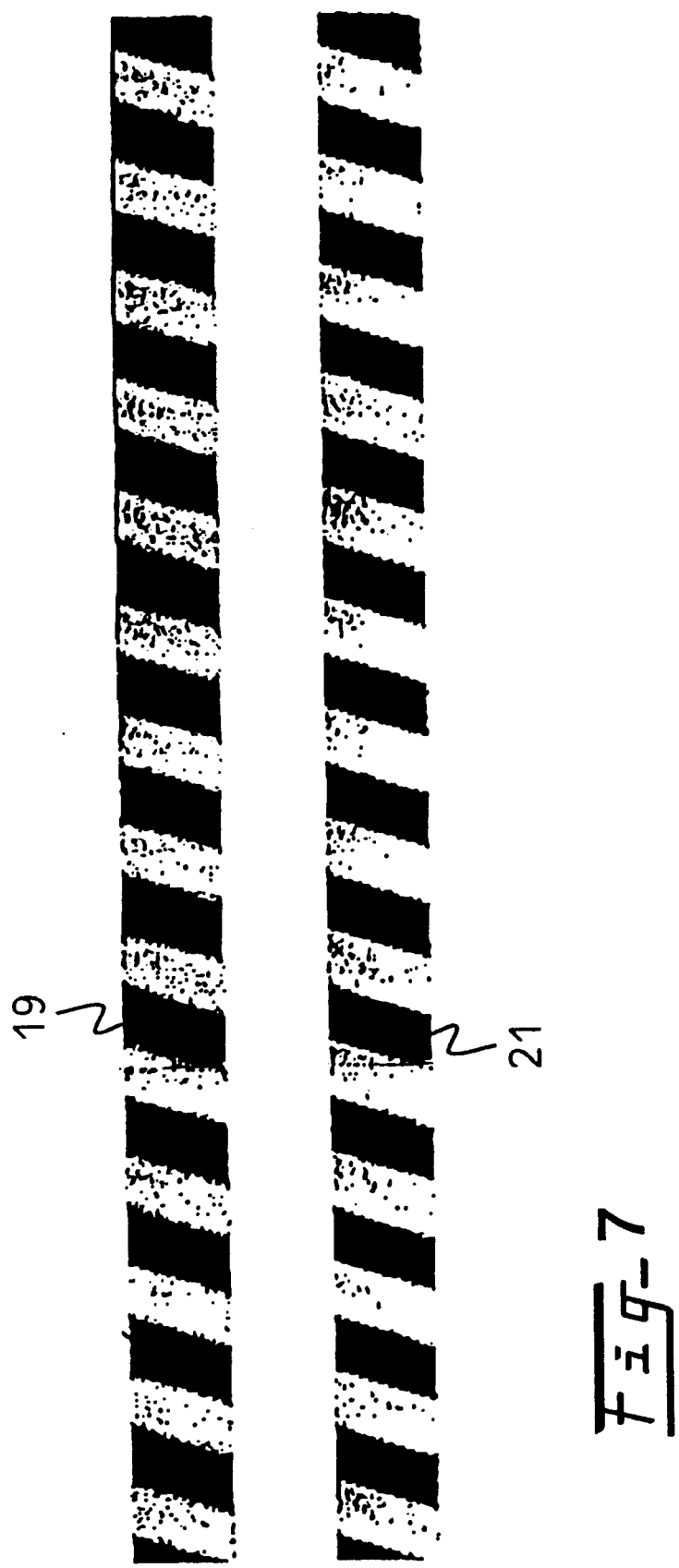
FIG. 7 shows the example bar pattern compressed and a synthesized ideal test pattern.

Now refer to FIG. 7 which shows the result of the synthesis of an ideal test pattern from a predetermined tilt angle, period, duty cycle, and center line of a predetermined bar pattern when the maximum value of N, the number of scan lines, is 512. The upper pattern 19 is the original predetermined bar pattern of FIG. 6 compressed by averaging. The lower pattern 21 is the synthesized bar pattern from the compressed original. In one embodiment of the invention, before the analysis of the sampled signal representation, the data from the y axis is compressed by averaging the image data from groups of 16 rows. For example, as shown in FIG. 7, image data from the first 16 rows is averaged and creates a compressed row. For example there are 512/16 rows in the compressed-pattern and synthesized bar pattern. The method and apparatus of the invention then operates on the compressed representation with the advantage that there is less data to process. Also the compressed representation has less noise because of the averaging step.

Figure 8:
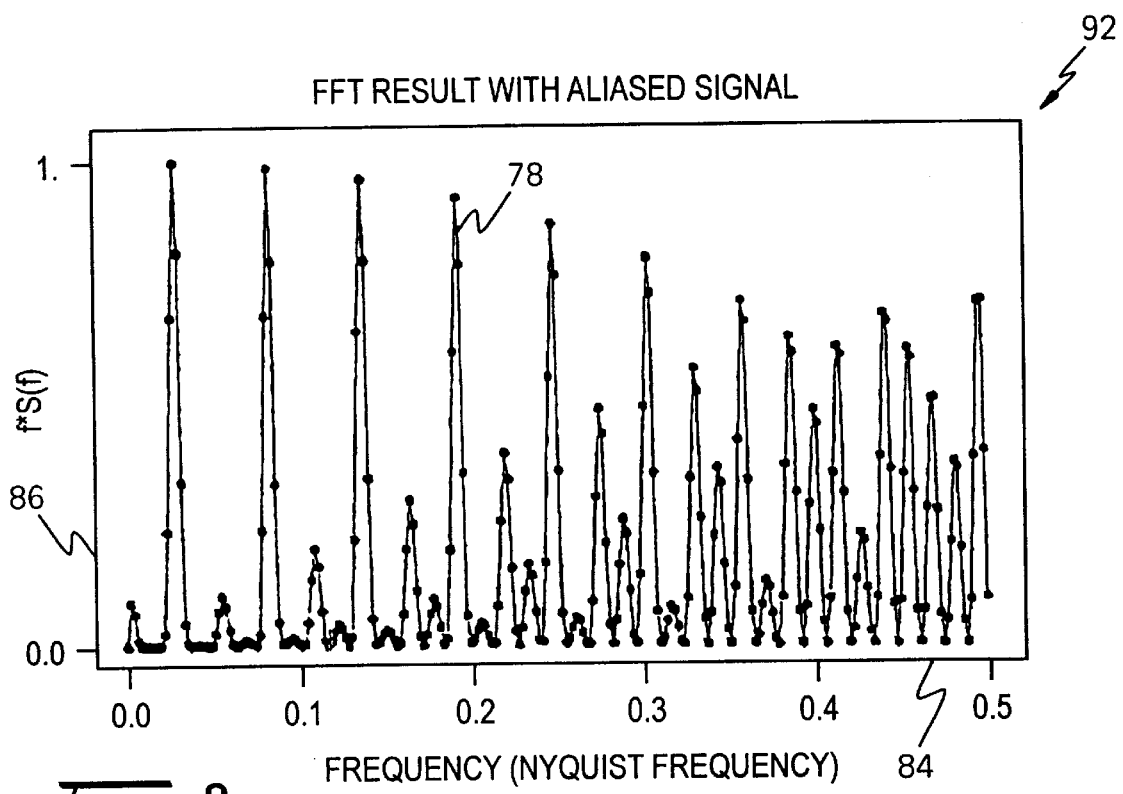
FIG. 8 shows a plot of FFT versus frequency with an aliased signal.

FIG. 8 shows a plot 92 of the FFT of one line parallel to the x axis of the sampled signal representation of bar pattern 19. The line chosen may be any one of the lines in the compressed image of the bar pattern 19. The x axis 84 shows the frequency of the bar pattern image in Nyquist frequency units. The y axis 86 shows the normalized magnitude of an FFT operation performed on a line of the sampled signal representation of compressed bar pattern 19.

Figure 9:
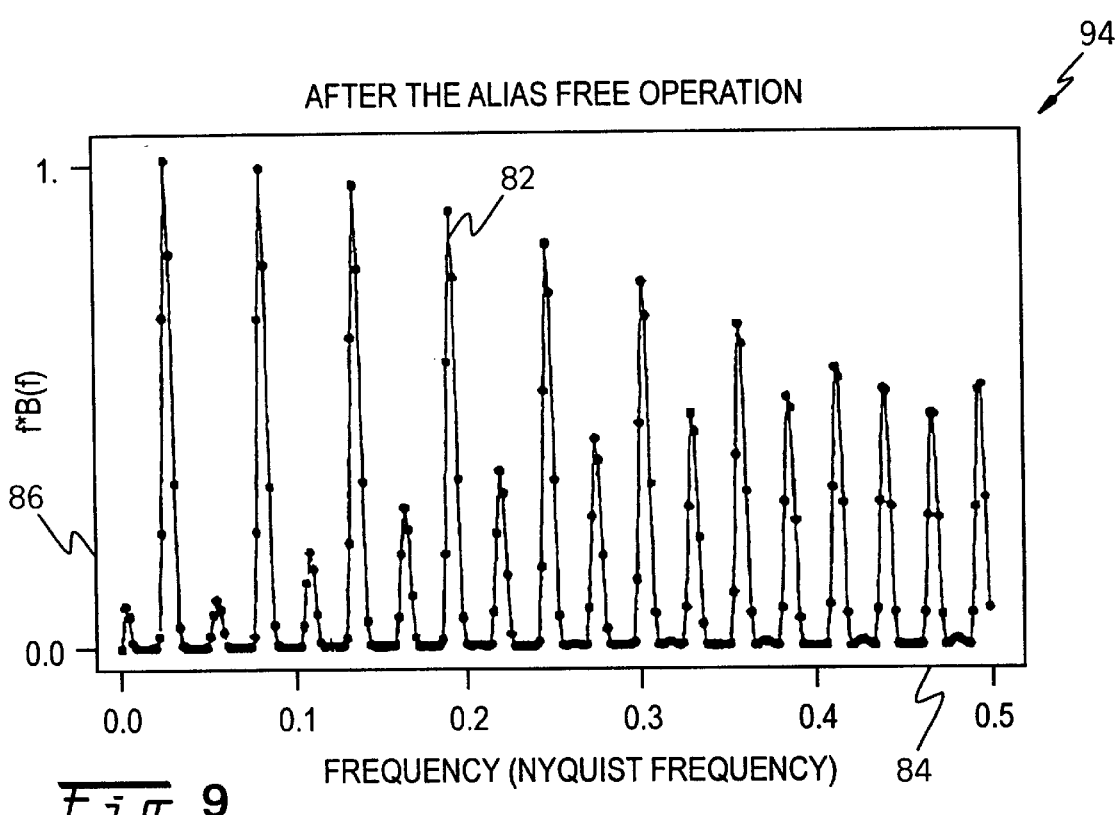
FIG. 9 shows a plot of FFT versus frequency with an alias free result.

FIG. 9 shows a plot 94 of the alias free measurement using the method and apparatus of the invention. The x axis 84 shows the frequency of the bar pattern image in Nyquist frequency units. The y axis 86 shows the normalized magnitude of the alias free operation performed on the sampled signal representation of the entire bar pattern 19.

Now refer to FIG. 8 and FIG. 9, the effect of the invention may be seen as a reduction in the number of signal peaks in the signal 78. The peaks that are removed from signal 82 are the unwanted peaks caused by aliasing error. The unwanted alias error generated peaks that may have overlapped other peaks in the signal that are not caused by alias error and may prevent an accurate OTF measurement.

Figure 10:
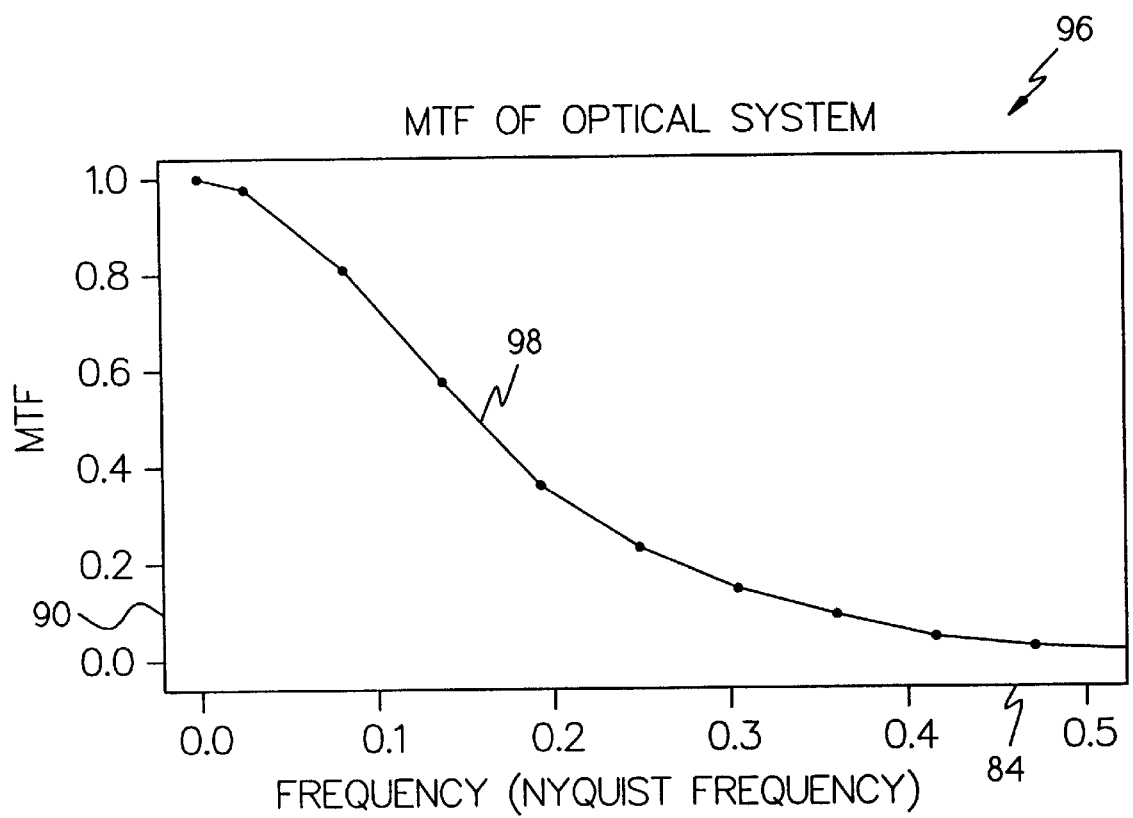
FIG. 10 shows a plot of the magnitude of the optical transfer function of a test optical system while viewing the example bar pattern.

FIG. 10 shows a plot 96 of the magnitude of the noise reduced optical transfer function OC, MTF, for the x axis derived from the compressed bar pattern 19 and ideal bar pattern 21 shown in FIG. 7. The curve 98 shows the frequency response of the optical system derived from imaging the bar pattern. The curve 98 shows the noise reduced relationship between the MTF, on the y axis 90, and the frequency, normalized to the Nyquist frequency, on the x axis 84 of the optical system imaging the bar pattern 10 shown in FIG. 6. Similar system characterizations can be derived from other test patterns. Curve 98 shows system response falling with increasing frequency.

Now refer to FIGS. 11A, 11B and 11C which show a schematic diagram of a biological specimen analysis system 500 incorporating the invention. The system comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510.

Referring also now to FIG. 11C which shows an automated microscope apparatus, in some embodiments, optics 510 may comprise color filters. In one embodiment of the invention, the optics may further comprise an automated microscope 511. The illuminator 508 provides illumination of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a MOTOROLA 68030 CPU. The motion controller 504 is comprised of a tray handler 518, a microscope stage controller 520, a microscope tray controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540. An Ethernet communication system 560 communicates to a workstation 542 to provide control of the system. A hard disk 544 is controlled by workstation 550. In one embodiment, workstation 542 may comprise a Sun SPARC Classic (™) workstation. A tape drive 546 is connected to the workstation 550 as well as a modem 548, a monitor 552, a keyboard 554, and a mouse pointing device 556. A printer 558 is connected to the Ethernet communication system 560.

During operation, the central computer 540, running a real time operating system, controls the microscope 511 and the processor to acquire and digitize images from the microscope 511. The flatness of the slide may be checked, for example, by contacting the four corners of the slide using a computer controlled touch sensor. The computer 540 also controls the microscope 511 stage to position the specimen under the microscope objective, and from one to fifteen field of view, FOV, processors 568 which receive images under control of the computer 540.

It is to be understood that the various processes described herein may be implemented in software suitable for running on a digital processor such as a commercially available personal computer or other suitable processor. The software may be embedded, for example, in the central processor 540.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method of alias free measurement of an optical transfer function of an optical system with a test pattern wherein the test pattern comprises a tilt angle that is relative to a predetermined axis, a period, a duty cycle and a bar with a bar center line, the method comprising the steps of:

(a) imaging the test pattern with the optical system to generate an image of the test pattern wherein the image has a sampled signal representation;

(b) measuring the tilt angle from the sampled signal representation;

(c) measuring the period from the sampled signal representation;

(d) measuring the duty cycle from the sampled signal representation;

(e) measuring the bar center line from the sampled signal representation;

(f) calculating a plurality of one dimensional Fourier transforms of the sampled signal representation to generate a plurality of frequency representations; and (g) determining the optical transfer function based on the plurality of frequency representations, the tilt angle, period, duty cycle, and bar center line.

2. The method of claim 1 further comprising the steps of:

(a) synthesizing an ideal test pattern from the tilt angle, period, duty cycle and center line;

(b) calculating an ideal optical transfer function for the ideal test pattern; and (c) calculating a noise reduced optical transfer function from the optical transfer function and the ideal optical transfer function.

3. The method of claim 2 wherein the ideal test pattern is described by $$I(x, y) = \left\{ [B_P(x, y; T, X_0, r, \tau) * P(x, y)] \sum_m \sum_n \delta(x - mX, y - nY) \right\} * P(x, y)$$

wherein a bar pattern function $B_p$ comprises $$B_P(x, y; T, X_0, r, \tau) = \pi\left(\frac{x - \tau(y - Y_c)}{rT}\right) * \sum_m \delta(x - mT - X_0, y)$$

wherein a sampling function comprises $$\delta(x, y) = \begin{cases} 1 & \text{if } x = y = 0 \\ 0 & \text{else} \end{cases}$$

wherein a bar function comprises $$\pi\left(\frac{x}{\alpha}\right) = \begin{cases} 1 & \text{if } -\frac{\alpha}{2} \leq x \leq \frac{\alpha}{2} \\ 0 & \text{else} \end{cases}$$

wherein a pixel function comprises $$P(x, y) = \pi\left(\frac{x}{X}\right)\pi\left(\frac{y}{Y}\right)$$

and wherein:

X,Y are the spacial sampling dimensions,

T is the period, $X_0$ is the centerline, r is the duty cycle, $Y_c$ is the center of the sampled image in the y dimension, $\tau$ is the $\tan(\theta)$ and $\theta$ is the tilt angle, and \* is the two dimensional convolution operator.

4. The method of claim 1 wherein the tilt angle is measured by a minimization of a cost function.

5. The method of claim 4 wherein the cost function comprises $$Cost = \frac{1}{N}\sum_{i=1}^{N}\int\left[s_0(x - \tau y_i, y_i) - \frac{1}{N}\sum_{j=1}^{N}s_0(x - \tau y_j, y_j)\right]^2 dx$$

wherein:

$s_0$=the sampled signal representation, $\tau$=$\tan\theta$ where $\theta$ represents the tilt angle, i=$i^{th}$ row of the sampled signal representation, N=number of rows of the sampled signal representation, and $y_i$=the position in the image corresponding to the $i^{th}$ row of the sampled signal representation.

6. The method of claim 4 wherein the minimization of the cost function further comprises the gradient descent method.

7. The method of claim 4 wherein the minimization of the cost function further comprises the conjugate gradient descent method.

8. The method of claim 4 wherein the minimization of the cost function further comprises Newton's method.

9. The method of claim 4 wherein the minimization of the cost function further comprises the golden section method.

10. The method of claim 4 wherein the minimization of the cost function further comprises the interval halving method.

11. The method of claim 1 wherein the step of measuring the period of the test pattern further comprises the steps of:

(a) estimating centers of dark and bright pulses in the sampled signal representation representing a bar of the test pattern;

(b) computing the period from the centers.

12. The method of claim 11 wherein the step of estimating a center of a pulse in a sampled signal representing a bar of the test pattern wherein a center line of a single pulse, $X^{(n)}_k$, center of $k^{th}$ single pulse and $n^{th}$ iteration of procedure, for fixed y, are determined by $$X_k^{(n+1)} = \frac{\int x\psi(x - X_k^{(n)})s_0(x, y)dx}{\int \psi(x - X_k^{(n)})s_0(x, y)dx}$$

and where $\psi(x)=\psi(-x)$ is a symmetric windowing function.

13. The method of claim 12 wherein an initial position $X_k^{(0)}$ is chosen by satisfying $$\frac{dq}{dX_k^{(0)}} < 1$$

where $q(X_k^{(0)})=\int x\psi(x-X_k^{(0)})s_0(x,y)dx/\int \psi(x-X_k^{(0)})s_0(x,y)dx.$ 14. The method of claim 1 wherein the step of measuring the duty cycle of the test pattern comprises the steps of:

(a) estimating centers of dark and bright pulses in the sampled signal representation;

(b) calculating bright pixel values and dark pixel values in the neighborhood of the centers;

(c) computing a period of the test pattern from the centers;

(d) calculating an average pixel value for a given period; and (e) computing the duty cycle from the average pixel value and the bright pixel values and dark pixel values.

15. The method of claim 1 wherein the step of measuring the bar center line further comprises the steps of:
  (a) estimating centers of a plurality of pulses in the sampled signal representation representing a bar of the bar pattern; and
  (b) estimating a center line of the bar pattern from the plurality of centers.

16. The method of claim 15 wherein the step of estimating a center of a pulse in the plurality of pulses in a sampled signal representation representing a bar of the test pattern, where a center line of a single pulse, $X^{(n)}_k$, center of $k^{th}$ single pulse and $n^{th}$ iteration of procedure, for fixed y, are determined by $$X_k^{(n+1)} = \frac{\int x\psi(x - X_k^{(n)})s_0(x, y)dx}{\int \psi(x - X_k^{(n)})s_0(x, y)dx}$$

and where $\psi(x)=\psi(-x)$ is a symmetric windowing function.

17. The method of claim 16 wherein an initial position $$X_k^{(0)}$$

is chosen by satisfying $$\frac{dq}{dX_k^{(0)}} < 1$$

where $q(X_k^{(0)}) = \int x\psi(x-X_k^{(0)})s_0(x,y)dx / \int \psi(x-X_k^{(0)})s_0(x,y)dx.$ 18. The method of claim 1 wherein a data representation $\hat{s}_0(x,y)$ represents the sampled signal representation, further comprising the steps of:
  (a) multiplying $\hat{s}_0(x,y)$ by a windowing function $w(x)$ which results in a windowed sampled signal representation $\hat{s}(x,y)=w(x-\tau y)s_0(x,y)$ where $\tau$ is $\tan(\theta)$ and $\theta$ is rotated angle;
  (b) taking a one dimensional Fourier transform in a x-dimension of $\hat{s}(x,y)$ which results in a frequency representation of a windowed signal $\hat{S}_x(f_x,y)$ where $f_x$ is a frequency corresponding to the x-dimension;
  (c) multiplying $\hat{S}_x(f_x,y)$ by exp $(j2\pi f_x X_0)$, where $X_0$ is a center of a center line, which results in a frequency representation of a shifted windowed signal $S_x(f_x,y)$
  (d) measuring an alias free frequency representation, $B(f_x)$, from $S_x(f_x,y)$;
  (e) extract $n^{th}$ harmonic components, $\alpha_n$, from $S_x(f_x,y)$ and
  (f) the optical transfer function, given $\alpha_n$, for frequency $nf_0$ is computed by:

$$OTF_{nf_0} = \frac{\pi n \alpha_n}{\sin(\pi n r)} \frac{r}{\alpha_0}$$

and $f_0=1/T$ where T is the period of the bar pattern.

19. The method of claim 18 where the alias free frequency representation, $B(f_x)$, can be estimated from a frequency representation of the shifted window signal $S_x(f_x,y)$ by $$S_x(f_x, y_i)\exp[j2\pi f_x y_i \theta] = \sum_{n=-\infty}^{\infty} B(f_x + n\Lambda_x)\exp[-j2\pi n\Lambda_x)y_i 1\tan\theta]$$

for i=1, . . . , N where $\Lambda_x=1/x$ where x is the sampling dimension in the x direction and where y is the y position in the $i^{th}$ row and where $\theta$ is the tilt angle.

20. The method of claim 18 further comprising the steps of estimating a frequency component of $B(f_x)$ by minimizing a cost function.

21. The method of claim 19, wherein the cost function to estimate $B(f_x)$ is represented by the following function:

$$Cost = \int \sum_{i=0}^{N} r(i) \left| \sum_n (B(f_x + n\Lambda_x)\exp\{-j2\pi(f_x + n\Lambda_x)y_i\tan\theta\}) - S_x(f_x, y_i) \right|^2 df_x$$

where r(i) is a weight value for the cost function for the $i^{th}$ row where $\Lambda_x=1/X$ where X is the sampling dimension in the x direction and where $y^i$ is the y position in the $i^{th}$ row and where $\theta$ is the tilt angle.

22. The method of claim 21 wherein the cost function is minimized by satisfying the following linear equation for each $f_x$:

$$\sum_{i=0}^{N} r(i) \sum_n B(f_x + n\Lambda_x)\exp\{-j2\pi(n-k)\Lambda_x\} y_i\tan\theta\} = \sum_{i=0}^{N} r(i)S_x(f_x, y_i)\exp\{j2\pi(f_x + k\Lambda_x)y_i\tan\theta\}$$

where k=. . . , -2, -1, 0, 1, 2, . . . .

23. The method of claim 18 wherein $\alpha_n$ is determined by minimizing the following cost function:

$$Cost_n = \sum_{f_x \in N} |\alpha_n W(f_x - nf_0) - B(f_x)|^2$$

where N is some interval containing $nf_0$ and W is the Fourier transform of the windowing function $w(x)$, and where n is the $n^{th}$ harmonic of the sampled signal representation.

24. A method of noise reduced alias free measurement of an optical transfer function of an optical system with a test pattern wherein the test pattern comprises a tilt angle that is relative to a predetermined axis, a period, a duty cycle and a bar with a bar center line, the method comprising the steps of:
  (a) imaging the test pattern with the optical system to generate a sampled signal representation of the test pattern;
  (b) calculating a first optical transfer function for the optical system, the period and tilt angle;
  (c) synthesizing a synthesized test pattern from the tilt angle, period and optical transfer function;
  (d) calculating a second optical transfer function for the synthesized test pattern test pattern; and
  (e) calculating a noise reduced optical transfer function from the first optical transfer function and the second optical transfer function.

25. The method of claim 24 further comprising the steps of:

(a) computing a difference image from the sampled signal representation and the synthesized test pattern; and (b) finding image defects in the sampled signal representation from the difference image.

26. The method of claim 24 wherein the step of finding image defects from the difference image further comprises the steps of:

(a) applying a difference threshold to the difference image in absolute value to produce a threshold image; and (b) applying a morphological operation to find regions in the threshold image that exceed the difference threshold.

27. The method of claim 26 wherein the morphological operation further comprises a morphological opening.

28. The method of claim 24 further comprising the steps of:

(a) computing a difference image from the sampled signal representation and the synthesized test pattern; and (b) measuring noise in the sampled signal representation from the difference image.

29. The method of claim 28 wherein the step of measuring noise in the sampled signal representation further comprises summing a variance of the difference image.

30. An apparatus for alias free measurement of an optical transfer function of an optical system with a test pattern wherein the test pattern comprises a tilt angle that is relative to a predetermined axis, a period, a duty cycle and a bar with a bar center line, the apparatus comprising:

(a) means for imaging the test pattern with the optical system to generate an image of the test pattern wherein the image has a sampled signal representation, wherein the means for imaging the test pattern has a sampled signal representation output;

(b) means for measuring the tilt angle, connected to the sampled signal representation output, having a tilt angle output;

(c) means for measuring the period, connected to the sampled signal representation output, having a period output;

(d) means for measuring the duty cycle, connected to the sampled signal representation output, having a duty cycle output;

(e) means for measuring the bar center line, connected to the sampled signal representation output, having a bar center line output;

(f) means for calculating a plurality of one dimensional Fourier transforms, connected to the sampled signal representation output, having a plurality of frequency representations output; and (g) means for determining the optical transfer function connected to the plurality of frequency representations output, the tilt angle output, period output, duty cycle output, and bar center line output, wherein the means for determining the optical transfer function has an optical transfer function output.

31. The apparatus of claim 30 wherein the means for calculating a plurality of one dimensional Fourier transforms further comprises a digital signal processor.

32. The apparatus of claim 30 wherein the means for determining the optical transfer function further comprises a digital computer.

33. An apparatus for noise reduced alias free measurement of an optical transfer function of an optical system with a test pattern wherein the test pattern comprises a tilt angle that is relative to a predetermined axis, a period, a duty cycle and a bar with a bar center line, the apparatus comprising:

(a) means for imaging the test pattern with the optical system having a sampled signal representation of the test pattern output;

(b) means for calculating an optical transfer function for the optical system, connected to the sampled signal representation of the test pattern output, having a first optical transfer function output, a tilt angle output and period output;

(c) means for synthesizing a synthesized test pattern, connected to the first optical transfer function output, tilt angle output and period output, having a synthesized test pattern output;

(d) means for calculating a second optical transfer function for the synthesized test pattern, connected to the test pattern output, having a second optical transfer function output; and (e) means for calculating a noise reduced optical transfer function, connected to the first optical transfer function output and second optical transfer function output, having a noise reduced optical transfer function output.

34. A method of alias free measurement of an optical transfer function of an optical system with a test pattern wherein the test pattern comprises a tilt angle that is relative to a predetermined axis, a period, a duty cycle and a bar with a bar center line, the method comprising the steps of:

(a) imaging the test pattern with the optical system to generate an image of the test pattern wherein the image has a sampled signal representation;

(b) measuring the tilt angle from the sampled signal representation;

(c) measuring the period from the sampled signal representation;

(d) measuring the duty cycle from the sampled signal representation;

(e) measuring the bar center line from the sampled signal representation;

(f) calculating a plurality of one dimensional Fourier transforms of the sampled signal representation to generate a plurality of frequency representations;

(g) determining the optical transfer function based on the plurality of frequency representations, the tilt angle, period, duty cycle, and bar center line;

(h) synthesizing an ideal test pattern from the tilt angle, period, duty cycle and center line;

(i) calculating an ideal optical transfer function for the ideal test pattern;

(j) calculating a noise reduced optical transfer function from the optical transfer function and the ideal optical transfer function; and (k) describing the ideal test pattern by:

$$I(x, y) = \left\{ [B_P(x, y; T, X_0, r, \tau) * P(x, y)] \sum_m \sum_n \delta(x - mX, y - nY) \right\} * P(x, y)$$

wherein a bar pattern function $B_p$ comprises $$B_P(x, y; T, X_0, r, \tau) = \pi\left(\frac{x - \tau(y - Y_c)}{rT}\right) * \sum_m \delta(x - mT - X_0, y)$$

wherein a sampling function comprises $$\delta(x, y) = \begin{cases} 1 & \text{if } x = y = 0 \\ 0 & \text{else} \end{cases}$$

wherein a bar function comprises $$\pi\left(\frac{x}{\alpha}\right) = \begin{cases} 1 & \text{if } -\frac{\alpha}{2} \leq x \leq \frac{\alpha}{2} \\ 0 & \text{else} \end{cases}$$

wherein a pixel function comprises $$P(x, y) = \pi\left(\frac{x}{X}\right)\pi\left(\frac{y}{Y}\right)$$

and wherein:
X,Y are spacial sampling dimensions,
T is the period,
$X_0$ is the centerline,
r is the duty cycle,
$Y_c$ is the center of the sampled image in the y dimension,
$\tau$ is the tan($\theta$) and $\theta$ is the tilt angle, and
* is the two dimensional convolution operator.

35. A method of alias free measurement of an optical transfer function of an optical system with a test pattern wherein the test pattern comprises a tilt angle that is relative to a predetermined axis, a period, a duty cycle and a bar with a bar center line, the method comprising the steps of:
(a) imaging the test pattern with the optical system to generate an image of the test pattern wherein the image has a sampled signal representation;
(b) measuring the period from the sampled signal representation;
(c) measuring the duty cycle from the sampled signal representation;
(d) measuring the bar center line from the sampled signal representation;
(e) calculating a plurality of one dimensional Fourier transforms of the sampled signal representation to generate a plurality of frequency representations;
(f) determining a cost function by the equation:

$$\text{Cost} = \frac{1}{N}\sum_{i=1}^{N}\int\left[s_0(x-\tau y_i, y_i) - \frac{1}{N}\sum_{j=1}^{N}s_0(x-\tau y_j, y_j)\right]^2 dx$$

wherein:
$s_0$=the sampled signal representation,
$\tau$=tan$\theta$ where $\theta$ represents the tilt angle,
i=$i^{th}$ row of the sampled signal representation,
N=number of rows of the sampled signal representation, and
$y_i$=the position in the image corresponding to the $i^{th}$ row of the sampled signal representation.
(g) determining the tilt angle by a minimization of the cost function; and
(h) determining the optical transfer function based on the plurality of frequency representations, the tilt angle, period, duty cycle, and bar center line.

36. A method of alias free measurement of an optical transfer function of an optical system with a test pattern wherein the test pattern comprises a tilt angle that is relative to a predetermined axis, a period, a duty cycle and a bar with a bar center line, the method comprising the steps of:
(a) imaging the test pattern with the optical system to generate an image of the test pattern wherein the image has a sampled signal representation;
(b) measuring the tilt angle from the sampled signal representation;
(c) measuring the period from the sampled signal representation;
(d) measuring the duty cycle from the sampled signal representation;
(e) measuring the bar center line from the sampled signal representation;
(f) calculating a plurality of one dimensional Fourier transforms of the sampled signal representation to generate a plurality of frequency representations;
(g) determining the optical transfer function based on the plurality of frequency representations, the tilt angle, period, duty cycle, and bar center line; and
(h) measuring the period of the test pattern by,
(i) estimating centers of dark and bright pulses in the sampled signal representation representing a bar of the test pattern, and
(ii) computing the period from the centers; and
(i) estimating a center of a pulse in a sampled signal representing a bar of the test pattern wherein a center line of a single pulse, $X^{(n)}_k$, center of $k^{th}$ single pulse and $n^{th}$ iteration of procedure, for fixed y, by $$X_k^{(n+1)} = \frac{\int x\psi(x - X_k^{(n)})s_0(x, y)dx}{\int \psi(x - X_k^{(n)})s_0(x, y)dx}$$

and where $\psi(x)=\psi(-x)$ is a symmetric windowing function.

37. The method of claim 36 wherein an initial position $$X_k^{(0)}$$

is chosen by satisfying $$\frac{dq}{dX_k^{(0)}} < 1$$

where $q(X_k^{(0)}) = \int x\psi(x-X_k^{(0)})s_0(x,y)dx / \int \psi(x-X_k^{(0)})s_0(x,y)dx.$ 38. A method of alias free measurement of an optical transfer function of an optical system with a test pattern wherein the test pattern comprises a tilt angle that is relative to a predetermined axis, a period, a duty cycle and a bar with a bar center line, the method comprising the steps of:
(a) imaging the test pattern with the optical system to generate an image of the test pattern wherein the image has a sampled signal representation;
(b) measuring the tilt angle from the sampled signal representation;
(c) measuring the period from the sampled signal representation;
(d) measuring the duty cycle from the sampled signal representation;
(e) measuring the bar center line from the sampled signal representation;

(f) calculating a plurality of one dimensional Fourier transforms of the sampled signal representation to generate a plurality of frequency representations;

(g) determining the optical transfer function based on the plurality of frequency representations, the tilt angle, period, duty cycle, and bar center line; and (h) measuring the bar center line by:
  (i) estimating centers of a plurality of pulses in the sampled signal representation representing a bar of the bar pattern,
  (ii) estimating a center line of the bar pattern from the plurality of centers;

(i) estimating a center of a pulse in the plurality of pulses in a sampled signal representation representing a bar of the test pattern, where a center line of a single pulse, $X^{(n)}_k$, center of $k^{th}$ single pulse and $n^{th}$ iteration of procedure, for fixed y, by $$X_k^{(n+1)} = \frac{\int x\psi(x - X_k^{(n)})s_0(x, y)dx}{\int \psi(x - X_k^{(n)})s_0(x, y)dx}$$

and where $\psi(x)=\psi(-x)$ is a symmetric windowing function.

39. The method of claim 38 wherein an initial position $$X_k^{(0)}$$

is chosen by satisfying $$\frac{dq}{dX_k^{(0)}} < 1$$

where $q(X_k^{(0)}) = \int x\psi(x-X_k^{(0)})s_0(x,y)dx / \int \psi(x-X_k^{(0)})s_0(x,y)dx.$ 40. A method of alias free measurement of an optical transfer function of an optical system with a test pattern wherein the test pattern comprises a tilt angle that is relative to a predetermined axis, a period, a duty cycle and a bar with a bar center line, the method comprising the steps of:

(a) imaging the test pattern with the optical system to generate an image of the test pattern wherein the image has a sampled signal representation;

(b) measuring the tilt angle from the sampled signal representation;

(c) measuring the period from the sampled signal representation;

(d) measuring the duty cycle from the sampled signal representation;

(e) measuring the bar center line from the sampled signal representation;

(f) calculating a plurality of one dimensional Fourier transforms of the sampled signal representation to generate a plurality of frequency representations;

(g) determining the optical transfer function based on the plurality of frequency representations, the tilt angle, period, duty cycle, and bar center line; and (h) determining a data representation $\hat{s}_0(x,y)$ to represent the sampled signal representation, by:
  (i) multiplying $\hat{s}_0(x,y)$ by a windowing function $w(x)$ which results in a windowed sampled signal representation $\hat{s}(x,y)=w(x-\tau y)s_0(x,y)$ where $\tau$ is $\tan(\theta)$ and $\theta$ is rotated angle;
  (ii) taking a one dimensional Fourier transform in a x-dimension of $\hat{s}(x,y)$ which results in a frequency representation of a windowed signal $\hat{S}_x(f_x,y)$ where $f_x$ is a frequency corresponding to the x-dimension;
  (iii) multiplying $\hat{S}_x(f_x,y)$ by $\exp(j2\pi f_x X_0)$, where $X_0$ is a center of a center line, which results in a frequency representation of a shifted windowed signal $S_x(f_x,y)$;
  (iv) measuring an alias free frequency representation, $B(f_x)$, from $S_x(f_x,y)$;
  (v) extract and harmonic components, $\alpha_n$, from $S_x(f_x, y)$; and
  (vi) the optical transfer function, given $\alpha_n$, for frequency $nf_0$ is computed by:

$$OTF_{nf_0} = \frac{\pi n \alpha_n}{\sin(\pi n r)} \frac{r}{\alpha_0}$$

and $f_0=1/T$ where T is the period of the bar pattern.

41. The method of claim 40 where the alias free frequency representation, $B(f_x)$, can be estimated from the frequency representation of a shifted window signal $S_x(f_x,y)$ by $$S_x(f_x, y_i)\exp[j2\pi f_x y_i \theta] = \sum_{n=-\infty}^{\infty} B(f_x + n\Lambda_x)\exp[-j2\pi n\Lambda_x y_i 1\tan\theta]$$

for i=1, . . . , N where $\Lambda_x=1/x$ where x is the sampling dimension in the x direction and where y is the y position in the $i^{th}$ row and where $\theta$ is the tilt angle.

42. The method of claim 41, wherein the cost function to estimate $B(f_x)$ is represented by the following function:

$$Cost = \int \sum_{i=0}^{N} r(i) \left| \sum_n (B(f_x + n\Lambda_x)\exp\{-j2\pi(f_x + n\Lambda_x)y_i\tan\theta\}) - S_x(f_x, y_i) \right|^2 df_x$$

where $r(i)$ is a weight value for the cost function for the $i^{th}$ row where $\Lambda_x=1/X$ where X is the sampling dimension in the x direction and where $y^i$ is the y position in the $i^{th}$ row and where $\theta$ is the tilt angle.

43. The method of claim 42 wherein the cost function is minimized by satisfying the following linear equation for each $f_x$:

$$\sum_{i=0}^{N} r(i) \sum_n B(f_x + n\Lambda_x)\exp\{-j2\pi(n-k)\Lambda_x)y_i\tan\theta\} =$$

$$\sum_{i=0}^{N} r(i)S_x(f_x, y_i)\exp\{j2\pi(f_x + k\Lambda_x)y_i\tan\theta\}$$

where k=. . . , -2, -1, 0, 1, 2, . . . .

44. The method of claim 40 further comprising the steps of estimating a frequency component of $B(f_x)$ by minimizing a cost function.

45. The method of claim 40 wherein $\alpha_n$ is determined by minimizing the following cost function:

$$Cost_n = \sum_{f_x \in N} |\alpha_n W(f_x - nf_0) - B(f_x)|^2$$

where N is some interval containing $nf_0$ and W is a Fourier transform of the windowing function $w(x)$, and where n is the $n^{th}$ harmonic of the sampled signal representation.

* * * * *